US012589480B2

(12) United States Patent
Squiers et al.

(10) Patent No.: US 12,589,480 B2
(45) Date of Patent: Mar. 31, 2026

(54) STORAGE DEVICE SYSTEM

(71) Applicants: Milwaukee Electric Tool Corporation, Brookfield, WI (US); Keter Plastic LTD., Herzelyia (IL)

(72) Inventors: Grant T. Squiers, Cudahy, WI (US); Yaron Brunner, Kibbutz Gvat (IL); Izhar Shani, Kibbutz Gvat (IL); Omer Menashri, Kibbutz Afikim (IL)

(73) Assignees: Milwaukee Electric Tool Corporation, Brookfield, WI (US); Keter Plastic LTD., Herzelyia (IL)

( * ) Notice: Subject to any disclaimer, the term of this patent is extended or adjusted under 35 U.S.C. 154(b) by 0 days.

(21) Appl. No.: 19/276,581

(22) Filed: Jul. 22, 2025

(65) Prior Publication Data

US 2025/0345924 A1 Nov. 13, 2025

Related U.S. Application Data

(63) Continuation of application No. 19/198,636, filed on May 5, 2025, which is a continuation of application (Continued)

(51) Int. Cl.
| | |
|---|---|
| *B25H 3/02* | (2006.01) |
| *A45C 5/14* | (2006.01) |

(Continued)

(52) U.S. Cl.
CPC .............. *B25H 3/022* (2013.01); *A45C 5/145* (2013.01); *A45C 13/262* (2013.01); *A45F 3/047* (2013.01);

(Continued)

(58) Field of Classification Search
CPC .......... B25H 3/022; B25H 3/02; B25H 3/028; A45C 5/145; A45C 13/262;

(Continued)

(56) References Cited

U.S. PATENT DOCUMENTS

| | | | |
|---|---|---|---|
| 2,042,387 | A | 5/1936 | Cobb |
| 2,430,200 | A | 11/1947 | Wilson |

(Continued)

FOREIGN PATENT DOCUMENTS

| | | |
|---|---|---|
| CN | 2608238 | 3/2004 |
| CN | 200947356 | 9/2007 |

(Continued)

OTHER PUBLICATIONS

"Blitz Box—Portable Storage Box / Shelf," The Green Head Finds Cool New Stuff, https://www.thegreenhead.com/2013/03/blitz-box-portable-storage-box-shelf.php, Per Wayback, website dates back to Feb. 15, 2015, 5 pages.

(Continued)

*Primary Examiner* — Jacob B Meyer
(74) *Attorney, Agent, or Firm* — Reinhart Boerner Van Deuren s.c.

(57) ABSTRACT

A tool storage device system includes a base and a tool storage container removably coupled to the base. The tool storage container slides in a first direction relative to the base to attach the tool storage container to the base, and the tool storage container slides in a second direction, opposite the first direction, relative to the base to remove the tool storage container from the base.

17 Claims, 32 Drawing Sheets

Related U.S. Application Data

No. 17/885,200, filed on Aug. 10, 2022, now Pat. No. 12,311,526, which is a continuation of application No. 16/682,979, filed on Nov. 13, 2019, now Pat. No. 11,426,859, which is a continuation of application No. PCT/US2018/033161, filed on May 17, 2018.

(60) Provisional application No. 62/507,310, filed on May 17, 2017.

(51) Int. Cl.

| | |
|---|---|
| *A45C 13/26* | (2006.01) |
| *A45F 3/00* | (2006.01) |
| *A45F 3/04* | (2006.01) |
| *B62B 5/06* | (2006.01) |
| *B65D 21/02* | (2006.01) |

(52) U.S. Cl.
CPC .... B65D 21/0223 (2013.01); *A45C 2013/267* (2013.01); *A45F 2003/003* (2013.01); *A45F 2003/045* (2013.01); *B25H 3/02* (2013.01); *B25H 3/028* (2013.01); *B62B 5/06* (2013.01); *B62B 2202/48* (2013.01)

(58) Field of Classification Search
CPC .............. A45C 2013/267; A45F 3/047; A45F 2003/003; A45F 2003/045; B65D 21/0223; B62B 5/06; B62B 2202/48
See application file for complete search history.

(56) References Cited

U.S. PATENT DOCUMENTS

| | | | |
|---|---|---|---|
| 2,970,358 A | 2/1961 | Elsner | |
| 3,117,692 A | 1/1964 | Carpenter et al. | |
| 3,225,865 A | 12/1965 | Downey | |
| 3,424,334 A | 1/1969 | Goltz | |
| 3,506,321 A | 4/1970 | Hampel | |
| 3,743,372 A | 7/1973 | Ruggerone | |
| D232,798 S | 9/1974 | Roche et al. | |
| 3,935,613 A | 2/1976 | Kaneko | |
| 3,974,898 A | 8/1976 | Tullis et al. | |
| 4,168,076 A | 9/1979 | Johnson | |
| 4,971,201 A | 11/1990 | Sathre | |
| 5,035,445 A | 7/1991 | Poulin | |
| D319,016 S | 8/1991 | Kahl | |
| 5,098,235 A | 3/1992 | Svetlik et al. | |
| D325,324 S | 4/1992 | Kahl | |
| 5,105,947 A | 4/1992 | Wise | |
| D326,815 S | 6/1992 | Meisner et al. | |
| 5,240,264 A | 8/1993 | Williams | |
| D340,167 S | 10/1993 | Kahl | |
| 5,301,829 A | 4/1994 | Chrisco | |
| D352,208 S | 11/1994 | Brookshire | |
| 5,429,260 A | 7/1995 | Vollers | |
| D361,511 S | 8/1995 | Dickinson et al. | |
| 5,538,213 A | 7/1996 | Brown | |
| 5,595,228 A | 1/1997 | Meisner et al. | |
| 5,608,603 A | 3/1997 | Su | |
| 5,628,443 A | 5/1997 | Deutsch | |
| D395,533 S | 6/1998 | Morison et al. | |
| 5,797,617 A | 8/1998 | Lin | |
| 5,890,613 A | 4/1999 | Williams | |
| 5,951,037 A | 9/1999 | Hsieh | |
| D415,393 S | 10/1999 | Kei | |
| 5,988,473 A | 11/1999 | Hagan et al. | |
| D420,860 S | 2/2000 | Golichowski et al. | |
| 6,050,660 A | 4/2000 | Gurley | |
| 6,085,925 A | 7/2000 | Chung | |
| 6,109,627 A | 8/2000 | Be | |
| 6,176,559 B1 | 1/2001 | Tiramani et al. | |
| D437,669 S | 2/2001 | Blason et al. | |
| 6,305,498 B1 | 10/2001 | Itzkovitch | |
| 6,347,847 B1 | 2/2002 | Tiramani et al. | |
| 6,367,631 B1 | 4/2002 | Steigerwald | |
| 6,371,320 B2 | 4/2002 | Sagol | |
| D456,972 S | 5/2002 | Blason et al. | |
| 6,431,580 B1 | 8/2002 | Kady | |
| 6,547,347 B2 | 4/2003 | Saito | |
| 6,601,930 B2 | 8/2003 | Tiramani et al. | |
| 6,619,772 B2 | 9/2003 | Dierbeck | |
| 6,637,707 B1 | 10/2003 | Gates | |
| 6,641,013 B2 | 11/2003 | Oise | |
| 6,945,546 B2 | 9/2005 | Guirlinger | |
| 6,948,691 B2 | 9/2005 | Brock et al. | |
| 6,983,946 B2 | 1/2006 | Sullivan et al. | |
| 7,044,484 B2 | 5/2006 | Wang | |
| 7,066,475 B2 | 6/2006 | Barnes | |
| D525,789 S | 8/2006 | Hosking | |
| D527,225 S | 8/2006 | Krieger et al. | |
| 7,147,243 B2 | 12/2006 | Kady | |
| D536,580 S | 2/2007 | Krieger et al. | |
| 7,263,742 B2 | 9/2007 | Valentini | |
| 7,367,571 B1 | 5/2008 | Nichols | |
| 7,503,569 B2 | 3/2009 | Duvigneau | |
| 7,658,887 B2 | 2/2010 | Hovatter | |
| 7,779,764 B2 | 8/2010 | Naidu et al. | |
| 7,780,026 B1 | 8/2010 | Zuckerman | |
| 7,841,144 B2 | 11/2010 | Pervan | |
| D630,851 S | 1/2011 | Landau et al. | |
| 8,028,845 B2 | 10/2011 | Himes | |
| D649,350 S | 11/2011 | Shitrit | |
| D653,832 S | 2/2012 | Vilkomirski et al. | |
| 8,132,819 B2 | 3/2012 | Landau | |
| 8,177,463 B2 | 5/2012 | Walker | |
| D661,858 S | 6/2012 | Lifshitz et al. | |
| 8,191,910 B2 | 6/2012 | Landau et al. | |
| D663,952 S | 7/2012 | Crevling et al. | |
| D664,354 S | 7/2012 | Crevling et al. | |
| D668,869 S | 10/2012 | Yamamoto et al. | |
| D674,605 S | 1/2013 | Vilkomirski et al. | |
| 8,454,033 B2 | 6/2013 | Tsai | |
| 8,459,495 B2 * | 6/2013 | Koenig ............. | B65D 25/2858 |
| | | | 220/761 |
| 8,505,729 B2 | 8/2013 | Sosnovsky et al. | |
| 8,567,796 B2 * | 10/2013 | Bar-Erez .................. | B62B 1/04 |
| | | | 280/47.26 |
| 8,657,307 B2 | 2/2014 | Lifshitz | |
| 8,677,661 B2 * | 3/2014 | Michels .................. | B25H 3/02 |
| | | | 40/313 |
| D701,696 S | 4/2014 | Shitrit et al. | |
| 8,689,396 B2 | 4/2014 | Wolfe | |
| 8,714,355 B2 | 5/2014 | Huang | |
| 8,740,010 B1 | 6/2014 | Page | |
| 8,813,960 B2 | 8/2014 | Fjelland | |
| 8,875,888 B2 | 11/2014 | Koenig | |
| 8,979,100 B2 | 3/2015 | Bensman et al. | |
| 8,985,922 B2 | 3/2015 | Neumann | |
| D738,105 S | 9/2015 | Shitrit | |
| D738,106 S | 9/2015 | Shitrit | |
| 9,132,543 B2 | 9/2015 | Bar-Erez | |
| D753,394 S | 4/2016 | Brunner | |
| D753,395 S | 4/2016 | Brunner | |
| D753,396 S | 4/2016 | Brunner | |
| 9,375,835 B1 | 6/2016 | Lin | |
| D765,974 S | 9/2016 | Tonelli et al. | |
| D770,179 S | 11/2016 | Menirom | |
| 9,506,489 B2 | 11/2016 | Ko | |
| 9,511,491 B2 | 12/2016 | Brunner | |
| D777,426 S | 1/2017 | Dahl | |
| 9,566,990 B2 | 2/2017 | Bar-Erez | |
| D784,089 S | 4/2017 | Furneaux et al. | |
| 9,616,562 B2 | 4/2017 | Hoppe | |
| 9,643,629 B2 | 5/2017 | Bar-Erez et al. | |
| D790,221 S | 6/2017 | Yahav et al. | |
| 9,701,443 B2 | 7/2017 | Wang | |
| 9,725,209 B1 | 8/2017 | Ben-Gigi | |
| D803,631 S | 11/2017 | Min et al. | |
| D806,483 S | 1/2018 | Stanford et al. | |
| 9,872,562 B2 | 1/2018 | Brunner | |
| D814,187 S | 4/2018 | Caglar | |
| D815,831 S | 4/2018 | Tonelli | |
| D816,334 S | 5/2018 | Brunner | |

(56) References Cited

U.S. PATENT DOCUMENTS

| | | | |
|---|---|---|---|
| D826,510 S | 8/2018 | Brunner | |
| D828,671 S | 9/2018 | Cope et al. | |
| D831,352 S | 10/2018 | Brunner | |
| 10,106,180 B2 | 10/2018 | Bar-Erez et al. | |
| D833,744 S | 11/2018 | Yahav et al. | |
| D836,995 S | 1/2019 | Carey et al. | |
| D837,515 S | 1/2019 | Shpitzer | |
| D839,681 S | 2/2019 | Evron et al. | |
| D845,080 S | 4/2019 | Jacobsen | |
| D845,081 S | 4/2019 | Jacobsen | |
| 10,286,542 B2 | 5/2019 | Wolle et al. | |
| D857,387 S | 8/2019 | Shpitzer | |
| 10,434,638 B1 | 10/2019 | Tsai | |
| D871,013 S | 12/2019 | Liu | |
| D873,085 S | 1/2020 | DeFrancia | |
| 10,583,962 B2 | 3/2020 | Brunner et al. | |
| D880,252 S | 4/2020 | Jacobsen | |
| D880,951 S | 4/2020 | Jacobsen | |
| D883,752 S | 5/2020 | Carey et al. | |
| D887,788 S | 6/2020 | Meda et al. | |
| D888,422 S | 6/2020 | Yang | |
| D888,503 S | 6/2020 | Meda et al. | |
| D891,193 S | 7/2020 | Stanford et al. | |
| D891,195 S | 7/2020 | Zhou | |
| D891,875 S | 8/2020 | Olson | |
| D892,565 S | 8/2020 | Astle et al. | |
| D893,183 S | 8/2020 | Eisenhardt | |
| 10,750,833 B2 | 8/2020 | Burchia | |
| D895,375 S | 9/2020 | Hurley, Jr. | |
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D903,430 S | 12/2020 | Eisenhardt | |
| D917,977 S | 5/2021 | Brunner | |
| D920,744 S | 6/2021 | Eisenhardt | |
| 11,267,119 B2 | 3/2022 | Hoppe | |
| 11,426,859 B2 | 8/2022 | Squiers | |
| 2002/0000440 A1 | 1/2002 | Sagal et al. | |
| 2002/0125072 A1 | 9/2002 | Levy | |
| 2002/0171228 A1 | 11/2002 | Kady | |
| 2003/0094393 A1 | 5/2003 | Sahm, III | |
| 2003/0115715 A1 | 6/2003 | Valentini | |
| 2003/0139080 A1 | 7/2003 | Lafragette et al. | |
| 2003/0146589 A1 | 8/2003 | Jarko et al. | |
| 2003/0184034 A1 | 10/2003 | Pfeiffer | |
| 2003/0205877 A1* | 11/2003 | Verna | B65D 25/54 |
| | | | 280/79.11 |
| 2004/0103494 A1 | 6/2004 | Valentini | |
| 2004/0195793 A1* | 10/2004 | Sullivan | B65D 25/2841 |
| | | | 280/63 |
| 2004/0206656 A1 | 10/2004 | Dubois et al. | |
| 2005/0062244 A1 | 3/2005 | Guirlinger | |
| 2005/0104308 A1 | 5/2005 | Barnes | |
| 2005/0139745 A1 | 6/2005 | Liao | |
| 2006/0006770 A1 | 1/2006 | Valentini | |
| 2006/0027475 A1* | 2/2006 | Gleason | B25H 3/021 |
| | | | 190/110 |
| 2006/0038367 A9 | 2/2006 | Ferraro | |
| 2006/0119060 A1 | 6/2006 | Sullivan et al. | |
| 2006/0186624 A1* | 8/2006 | Kady | B62B 1/125 |
| | | | 280/47.33 |
| 2006/0254946 A1 | 11/2006 | Becklin | |
| 2007/0012694 A1* | 1/2007 | Duvigneau | B25H 3/026 |
| | | | 220/4.27 |
| 2007/0068757 A1 | 3/2007 | Tan | |
| 2007/0090616 A1 | 4/2007 | Tompkins | |
| 2007/0138041 A1 | 6/2007 | Welsh | |
| 2007/0145700 A1 | 6/2007 | Ambrose et al. | |
| 2007/0194543 A1* | 8/2007 | Duvigneau | B25H 3/026 |
| | | | 280/47.26 |
| 2008/0104921 A1 | 5/2008 | Pervan | |
| 2008/0115312 A1* | 5/2008 | DiPasquale | A47L 9/26 |
| | | | 15/327.2 |
| 2008/0121547 A1 | 5/2008 | Dur et al. | |
| 2008/0134607 A1 | 6/2008 | Pervan et al. | |
| 2008/0169739 A1 | 7/2008 | Goldenberg | |
| 2008/0271280 A1 | 11/2008 | Fuchs et al. | |
| 2008/0277221 A1 | 11/2008 | Josefson | |
| 2008/0308369 A1 | 12/2008 | Louis | |
| 2009/0026901 A1 | 1/2009 | Nies, III et al. | |
| 2009/0071990 A1* | 3/2009 | Jardine | A45F 3/10 |
| | | | 224/155 |
| 2009/0145790 A1 | 6/2009 | Panosian | |
| 2009/0145866 A1 | 6/2009 | Panosian et al. | |
| 2009/0145913 A1 | 6/2009 | Panosian et al. | |
| 2009/0178946 A1* | 7/2009 | Patstone | B65D 21/0223 |
| | | | 206/509 |
| 2009/0236482 A1* | 9/2009 | Winig | A47B 57/408 |
| | | | 248/220.43 |
| 2010/0052276 A1 | 3/2010 | Brunner | |
| 2010/0139566 A1 | 6/2010 | Lopuszanski | |
| 2010/0147642 A1 | 6/2010 | Andochick | |
| 2010/0219193 A1 | 9/2010 | Becklin | |
| 2010/0290877 A1* | 11/2010 | Landau | B25H 3/028 |
| | | | 414/490 |
| 2011/0073516 A1 | 3/2011 | Zelinskiy | |
| 2011/0139665 A1* | 6/2011 | Madsen | B25H 3/026 |
| | | | 206/508 |
| 2011/0155613 A1* | 6/2011 | Koenig | B65D 21/0223 |
| | | | 206/503 |
| 2011/0174939 A1* | 7/2011 | Taylor | F16M 11/10 |
| | | | 24/565 |
| 2011/0181008 A1 | 7/2011 | Bensman | |
| 2011/0220531 A1 | 9/2011 | Meether et al. | |
| 2011/0260588 A1 | 10/2011 | Lin | |
| 2012/0160886 A1 | 6/2012 | Henny et al. | |
| 2012/0180250 A1 | 7/2012 | Ricklefsen et al. | |
| 2012/0207571 A1* | 8/2012 | Scott | B65G 65/24 |
| | | | 414/419 |
| 2012/0292213 A1 | 11/2012 | Brunner | |
| 2012/0326406 A1 | 12/2012 | Lifshitz | |
| 2013/0024468 A1 | 1/2013 | Kocsis | |
| 2013/0031731 A1 | 2/2013 | Hess | |
| 2013/0031732 A1 | 2/2013 | Hess et al. | |
| 2013/0068903 A1 | 3/2013 | O'Keene | |
| 2013/0121783 A1 | 5/2013 | Kelly | |
| 2013/0127129 A1* | 5/2013 | Bensman | B65D 21/0209 |
| | | | 206/349 |
| 2013/0146551 A1* | 6/2013 | Simpson | A47B 57/408 |
| | | | 211/86.01 |
| 2013/0154218 A1 | 6/2013 | Tiilikainen | |
| 2013/0223971 A1 | 8/2013 | Grace, IV | |
| 2014/0076759 A1 | 3/2014 | Roehm et al. | |
| 2014/0161518 A1 | 6/2014 | Ko | |
| 2014/0166516 A1 | 6/2014 | Martinez | |
| 2014/0265440 A1 | 9/2014 | Chen et al. | |
| 2015/0034515 A1 | 2/2015 | Monyak et al. | |
| 2015/0151427 A1 | 6/2015 | Ben-Gigi | |
| 2015/0274362 A1 | 10/2015 | Christopher et al. | |
| 2015/0376917 A1 | 12/2015 | Brunner | |
| 2016/0023349 A1* | 1/2016 | Hoppe | A45C 13/36 |
| | | | 280/47.24 |
| 2016/0130034 A1 | 5/2016 | Kuhls | |
| 2016/0144500 A1 | 5/2016 | Chen | |
| 2016/0168880 A1 | 6/2016 | Phelan | |
| 2016/0221177 A1 | 8/2016 | Reinhart | |
| 2017/0121056 A1 | 5/2017 | Wang | |
| 2017/0138382 A1 | 5/2017 | Ko | |
| 2017/0165828 A1 | 6/2017 | Fleischmann | |
| 2017/0166352 A1 | 6/2017 | Hoppe | |
| 2017/0174392 A1 | 6/2017 | De Loynes | |
| 2017/0217464 A1 | 8/2017 | Bar-erez et al. | |
| 2017/0239808 A1 | 8/2017 | Hoppe | |
| 2017/0257958 A1 | 9/2017 | Sabbag et al. | |
| 2017/0266804 A1 | 9/2017 | Kinskey | |
| 2017/0318927 A1 | 11/2017 | Krause et al. | |
| 2017/0349013 A1 | 12/2017 | Gronholm | |
| 2018/0044059 A1 | 2/2018 | Brunner | |
| 2018/0099405 A1 | 4/2018 | Reinhart | |
| 2018/0153312 A1* | 6/2018 | Buck | A47F 5/0846 |
| 2018/0161975 A1 | 6/2018 | Brunner | |

(56) References Cited

U.S. PATENT DOCUMENTS

| | | | |
|---|---|---|---|
| 2018/0186513 A1 | 7/2018 | Brunner | |
| 2018/0220758 A1 | 8/2018 | Burchia | |
| 2018/0290288 A1 | 10/2018 | Brunner | |
| 2019/0002004 A1 | 1/2019 | Brunner | |
| 2019/0031222 A1 | 1/2019 | Takyar et al. | |
| 2019/0039781 A1 | 2/2019 | Kogel | |
| 2019/0106244 A1 | 4/2019 | Brunner et al. | |
| 2019/0225371 A1 | 7/2019 | Hoppe et al. | |
| 2020/0055534 A1 | 2/2020 | Hassell | |
| 2020/0147781 A1* | 5/2020 | Squiers | A45C 13/02 |
| 2020/0165036 A1* | 5/2020 | Squiers | A45F 3/08 |
| 2020/0243925 A1 | 7/2020 | Polakowski et al. | |
| 2020/0299027 A1 | 9/2020 | Brunner et al. | |
| 2022/0379461 A1 | 12/2022 | Squiers | |

FOREIGN PATENT DOCUMENTS

| | | |
|---|---|---|
| CN | 101068661 | 11/2007 |
| CN | 102137795 | 7/2011 |
| CN | 102248523 | 11/2011 |
| CN | 102469899 | 5/2012 |
| CN | 102608238 | 7/2012 |
| CN | 102834035 | 12/2012 |
| CN | 302371147 | 3/2013 |
| CN | 103118578 | 5/2013 |
| CN | 103659777 | 3/2014 |
| CN | 204161752 | 2/2015 |
| DE | 3510307 | 9/1986 |
| DE | 9313802 | 12/1993 |
| DE | 4415638 | 11/1995 |
| DE | 29708343 | 7/1997 |
| DE | 19750543 | 5/1999 |
| DE | 20218996 | 3/2003 |
| DE | 102004057870 | 6/2006 |
| DE | 202011002617 | 4/2011 |
| DE | 102010003754 | 10/2011 |
| DE | 102010003756 | 10/2011 |
| DE | 102012106482 | 1/2014 |
| DE | 102012220837 | 5/2014 |
| DE | 202014103695 | 10/2014 |
| DE | 102013008630 | 11/2014 |
| DE | 202015105053 | 10/2016 |
| DE | 202015005752 | 11/2016 |
| DE | 102015112204 | 2/2017 |
| DE | 102015013053 | 4/2017 |
| DE | 402018201520 | 5/2018 |
| EM | 000705231-0001 | 4/2007 |
| EM | 002419283-0001 | 3/2014 |
| EP | 0916302 | 5/1999 |
| EP | 1018473 B1 | 1/2003 |
| EP | 1321247 | 6/2003 |
| EP | 1428764 | 6/2004 |
| EP | 1724069 A2 | 11/2006 |
| EP | 1819487 | 8/2007 |
| EP | 2289671 | 3/2011 |
| EP | 2346741 | 7/2011 |
| EP | 2456341 | 5/2012 |
| EP | 2543297 | 1/2013 |
| EP | 2555660 | 2/2013 |
| EP | 2555661 | 2/2013 |
| EP | 2537641 B1 | 9/2016 |
| EP | 2338650 B1 | 10/2016 |
| EP | 2805799 | 11/2016 |
| EP | 3141354 | 3/2017 |
| GB | 694707 | 7/1953 |
| GB | 2047181 B | 2/1983 |
| GB | 2110076 | 6/1983 |
| GB | 2211486 | 7/1989 |
| GB | 2330521 | 4/1999 |
| GB | 2406331 | 3/2005 |
| GB | 2413265 | 10/2005 |
| GB | 2449934 | 12/2008 |
| JP | 2003194020 A | 7/2003 |
| JP | D1180963 | 8/2003 |
| JP | 1276744 | 7/2006 |
| JP | D1395115 | 8/2010 |
| JP | D1395116 | 8/2010 |
| JP | D1455321 | 11/2012 |
| JP | 2013022972 | 2/2013 |
| JP | 2013022976 | 2/2013 |
| JP | 1477050 | 8/2013 |
| JP | D1503434 | 7/2014 |
| JP | D1625407 | 2/2019 |
| JP | D1665028 | 8/2020 |
| KR | 30-0271616 | 2/2000 |
| KR | 30-0320243 | 6/2002 |
| KR | 3008066040000 | 7/2015 |
| KR | 3008422360000 | 3/2016 |
| KR | 3008496000000 | 4/2016 |
| KR | 3008599650000 | 6/2016 |
| KR | 3008812960000 | 11/2016 |
| KR | 3009995990000 | 3/2019 |
| TW | 206875 | 5/1993 |
| TW | I324578 | 5/2010 |
| TW | 135074 | 6/2010 |
| TW | 168686 | 7/2015 |
| TW | 174412 | 3/2016 |
| TW | D192092 | 8/2018 |
| WO | WO2005/045886 | 5/2005 |
| WO | WO2007/121746 | 11/2007 |
| WO | WO07121745 | 11/2007 |
| WO | WO07121746 | 11/2007 |
| WO | WO2007121745 A1 | 11/2007 |
| WO | WO2008/090546 | 7/2008 |
| WO | WO2009/140965 | 11/2009 |
| WO | WO09140965 | 11/2009 |
| WO | WO2011/000387 | 1/2011 |
| WO | WO2011/009480 | 1/2011 |
| WO | WO11009480 | 1/2011 |
| WO | WO2011/032568 | 3/2011 |
| WO | WO2011/131213 | 10/2011 |
| WO | WO2012/000497 | 1/2012 |
| WO | WO2013/026084 | 2/2013 |
| WO | WO13026084 | 2/2013 |
| WO | WO2014/125484 | 8/2014 |
| WO | WO2014/125488 | 8/2014 |
| WO | WO14125488 | 8/2014 |
| WO | WO2016142935 | 9/2016 |
| WO | WO2017028845 | 2/2017 |
| WO | WO2017/191628 | 11/2017 |
| WO | WO2017/212840 | 12/2017 |
| WO | WO17212840 | 12/2017 |
| WO | WO2018/213560 | 11/2018 |
| WO | WO2019/028041 | 2/2019 |

OTHER PUBLICATIONS

"BluCave Universal Storage System," Batavia Tools to Build, https://batavia.eu/blucave-storage-system/, believed to be available at least as early as Nov. 29, 2017, 5 pages.
"Dewalt Tstak Carrier Trolley," ITS, https://www.its.co.uk/pd/171229-Dewalt-TSTAK-Carrier-Trolley-_DEW171229.htm, Per Wayback, website dates back to May 2, 2015, 2 pages.
"DeWalt Tstak Vac Rack (Suits DW DWV902M & DWV900L) DWV9500-XJ," Get Tools Direct, https://www.gettoolsdirect.com.au/dewalt-tstak-vac-rack-suits-dwv902m-and-dwv900l-dwv9500-xj.html, believed to be available at least as early as Nov. 29, 2017, 4 pages.
"Hopkins FloTool 91002 Rhino Box with Mount," Amazon.com, https://www.amazon.com/exec/obidos/ASIN/B003K15F3l/20140000-20, believed to be available at least as early as Nov. 29, 2017, 7 pages.
"Tool Skool, Tstak Phase 2 Upgrades | Tstak Carts—First Look—Tool Skool," YouTube, Sep. 7, 2013, https://www.youtube.com/watch?v=jb06y6J1dr4&feature=youtu.be&t=197, 1 page.
Batavia Gmbh, BluCave Storage System, https://protect-us.mimecast.com/s/5XIGCR6KypcgJnIKi9EDoim?domain=batavia.eu, believed to be available at least as early as Nov. 29, 2017, 7 pages.
BluCave Video, https://www.youtube.com/watch?v=Sw7fQQPwoOtY&feature=youtu.be&t=32, believed to be available at least as early as Nov. 29, 2017.

(56) References Cited

OTHER PUBLICATIONS

International Search Report and Written Opinion for International Application No. PCT/IL2019/050689, dated Aug. 23, 2019, 21 pages.
International Search Report and Written Opinion for International Application No. PCT/US2018/033161, dated Aug. 6, 2018, 14 pages.
International Search Report and Written Opinion for International Application No. PCT/US2018/044629, dated Jan. 9, 2019, 22 pages.
International Search Report and Written Opinion for International Application No. PCT/US2019/014940, dated Jul. 26, 2019, 7 pages.
Sortimo Logistix, "Mobile Sortimente", brochure, believed to be available at least as early as Nov. 29, 2017, 17 pages.
Stuart, "Ryobi ToolBlox Tool Cabinet System!," Toolguyd, Sep. 18, 2014, https://toolguyd.com/ryobi-toolblox-cabinets/, 23 pages.
Stuart, "Sys-Cart Base, a Systainer Mounting Platform," Toolguyd, Jul. 28, 2014, https://toolguyd.com/systainer-sys-cart-mounting-base/, 11 pages.
Vertak, https://www.alibaba.com/product-detail/Vertak-global-patented-multi-funciton-portable_60217794260.html, believed to be available at least as early as Nov. 29, 2017.
Non-Final Rejection issued Apr. 12, 2018, in U.S. Appl. No. 15/826,201. (16 Pages) (Docket No. J699501JS01 446373-419).
International Search Report and Written Opinion for International Application No. PCT/IL2020/050433, dated Jun. 21, 2020, 14 pages.
Respondent's Notice of Prior Art, Investigation No. 337-TA-1409, dated Oct. 29, 2024, 11 pages.
Inter Partes Review No. 2024-01400, "Petition for Inter Partes Review of U.S. Pat. No. 11,365,026" Filed Sep. 17, 2024, 147 pages.
Exhibit 1001 in "Petition for Inter Partes Review of U.S. Pat. No. 11,365,026" Filed Sep. 17, 2024, 66 pages.
Exhibit 1002 in "Petition for Inter Partes Review of U.S. Pat. No. 11,365,026" Filed Sep. 17, 2024, 324 pages.
Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.
Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.
Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794,952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of U.S. Pat. No. 11,794,952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of U.S. Pat. No. 11,794,952" Filed Sep. 17, 2024, 4 pages.
Exhibit 1011 in "Petition for Inter Partes Review of U.S. Pat. No. 11,794,952" Filed Sep. 17, 2024, 16 pages.
Exhibit 1012 in "Petition for Inter Partes Review of U.S. Pat. No. 11,794,952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of U.S. Pat. No. 11,794,952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of U.S. Pat. No. 11,794,952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of U.S. Pat. No. 11,794,952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of U.S. Pat. No. 11,794,952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.

(56) References Cited

OTHER PUBLICATIONS

Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.

* cited by examiner

10

14

18

170B

170B

SH

STORAGE DEVICE SYSTEM

CROSS-REFERENCE TO RELATED APPLICATIONS

This application is a continuation of U.S. application Ser. No. 19/198,636, filed May 5, 2025, which is a continuation of U.S. application Ser. No. 17/885,200, filed Aug. 10, 2022, now U.S. Pat. No. 12,311,526, which is a continuation of U.S. application Ser. No. 16/682,979, filed Nov. 13, 2019, now U.S. Pat. No. 11,426,859, which is a continuation of International Application No. PCT/US2018/033161, filed May 17, 2018, which claims priority to U.S. Provisional Application No. 62/507,310, filed on May 17, 2017, each of which are incorporated by reference herein in their entireties.

BACKGROUND

The present invention relates to storage devices, including bags, storage totes, tool boxes and organizers.

Tool storage devices are often used to transport tools and accessories. Tool storage devices include soft-sided storage devices such as a tool bags, and rigid storage devices such as tool boxes and organizers. Soft-sided storage devices include walls made of flexible material and typically have a bottom made of a rigid material. Rigid storage devices include a rigid base and a rigid cover coupled thereto. The rigid base may include dividers and storage compartments for storing and organizing tools and accessories.

SUMMARY

The present invention provides, in one aspect, a backpack including a first shoulder strap, a second shoulder strap, a base coupled to the first and second shoulder straps, the base configured to extend along a user's back when the shoulder straps extend over the user's shoulders, and a tool storage container. The tool storage container is removably coupled to the base. The tool storage container slides in a first direction relative to the base to attach the tool storage container to the base, and the tool storage container slides in a second direction, opposite the first direction, relative to the base to remove the tool storage container from the base.

The present invention provides, in another aspect, a tool cart including a plurality of wheels configured to support the tool cart on a surface such that the tool cart can roll along the surface, and a base having a top side and a bottom side opposite the top side. The plurality of wheels are positioned adjacent the bottom side. The tool cart further includes a tool storage container removably coupled to the top side of the base. The tool storage container slides in a first direction relative to the base and generally parallel to the top side to attach the tool storage container to the base, and the tool storage container slides in a second direction, opposite the first direction, relative to the base and generally parallel to the top side to remove the tool storage container from the base.

The present invention provides, in another aspect, a tool cart including a base with a top side, a bottom side opposite the top side, a first end, and a second end opposite the first end. The tool cart also includes a handle that extends from the first end, first and second wheels adjacent the second end, and a tool storage container. The tool storage container is removably coupled to the top side of the base. The tool storage container slides in a first direction relative to the base and generally parallel to the top side to attach the tool storage container to the base, and the tool storage container slides in a second direction, opposite the first direction, relative to the base and generally parallel to the top side to remove the tool storage container from the base.

Other features and aspects of the invention will become apparent by consideration of the following detailed description and accompanying drawings.

US 12,589,480 B2

3

Figure 28:
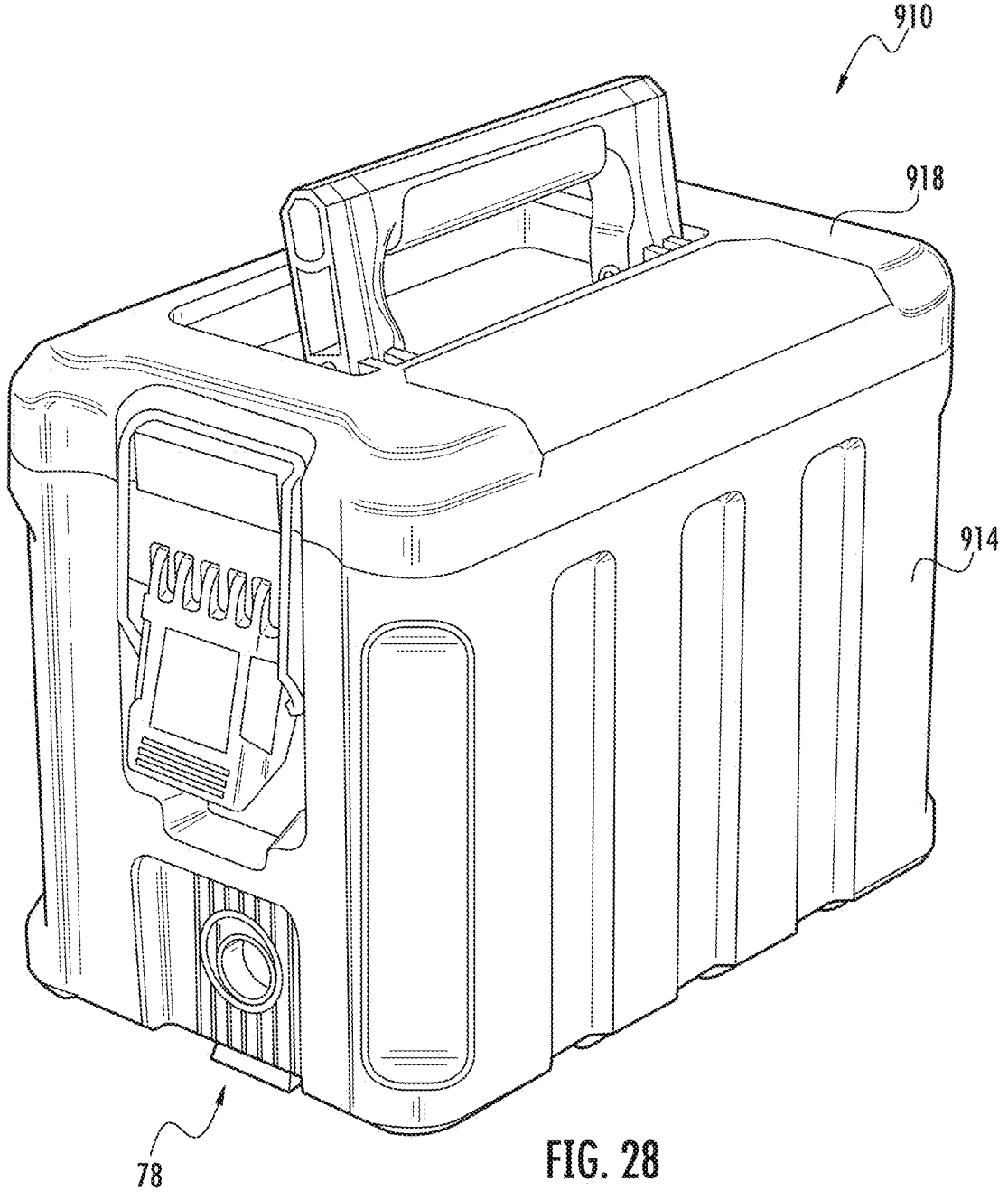

FIG. 28 is a perspective view of a cooler according to one embodiment.

Figure 29:
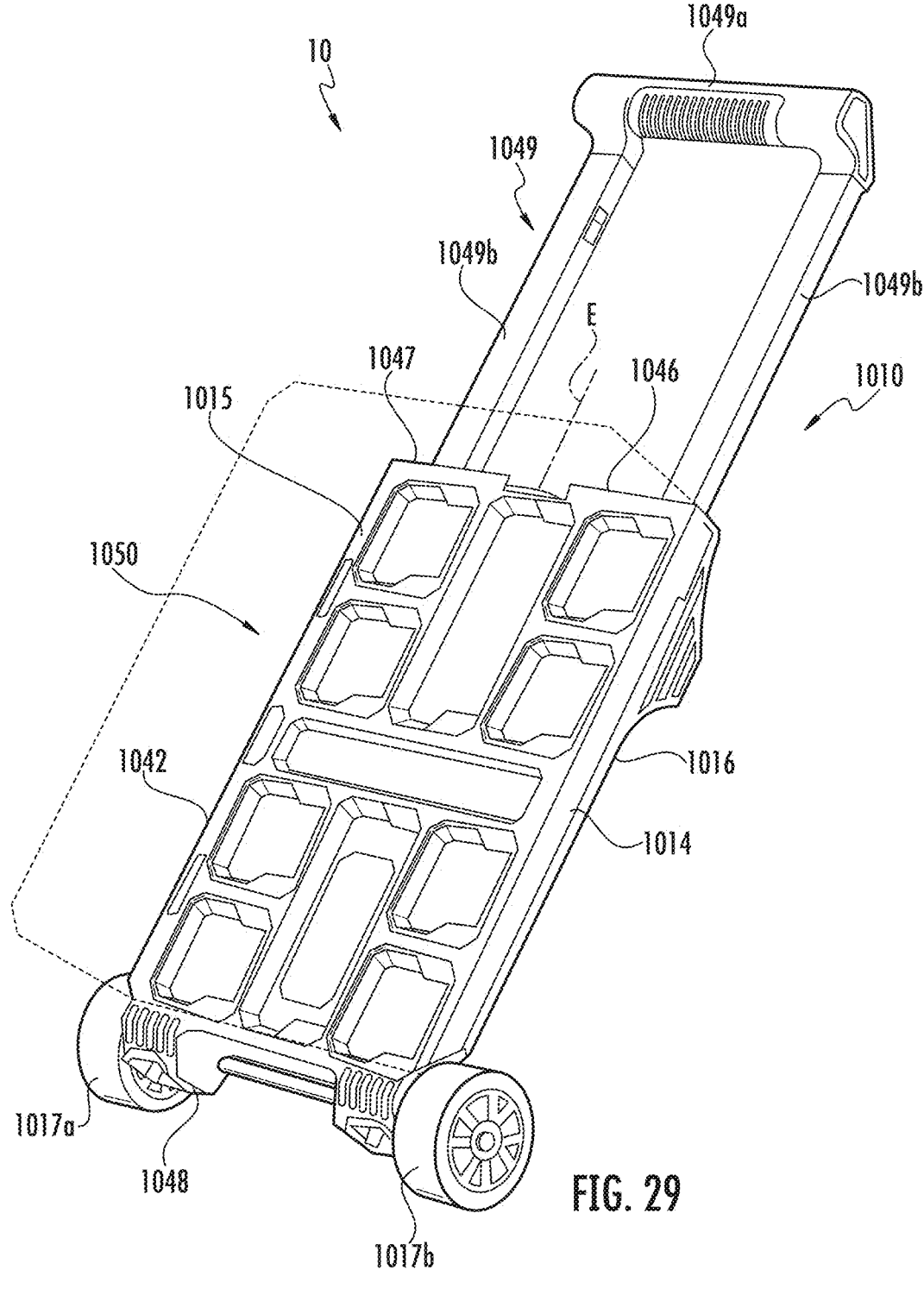

FIG. 29 is a perspective view of a tool cart of the storage device system according to another embodiment.

Figure 30:
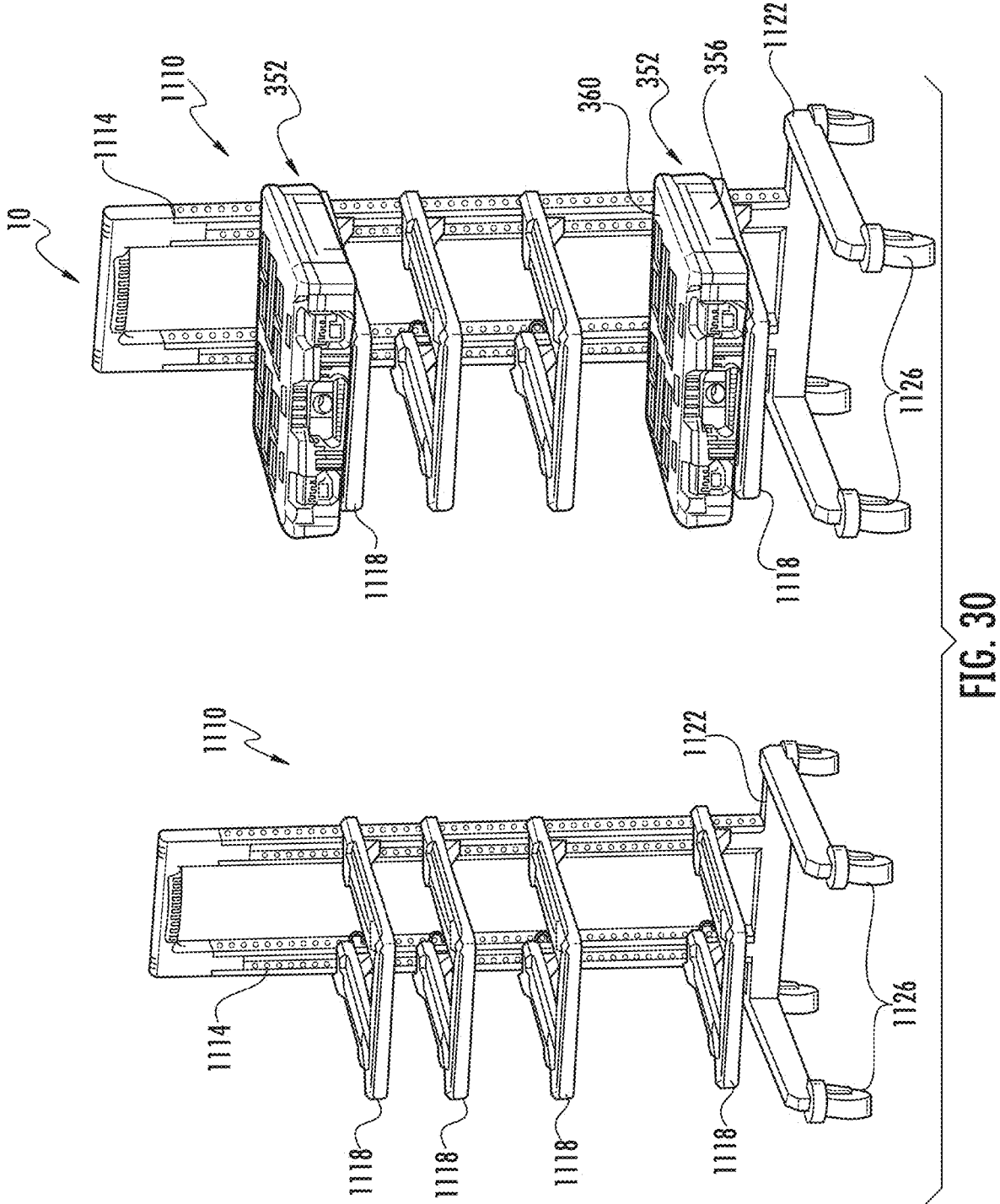

FIG. 30 is a perspective view of a shelf unit of the storage device system.

Figure 31:
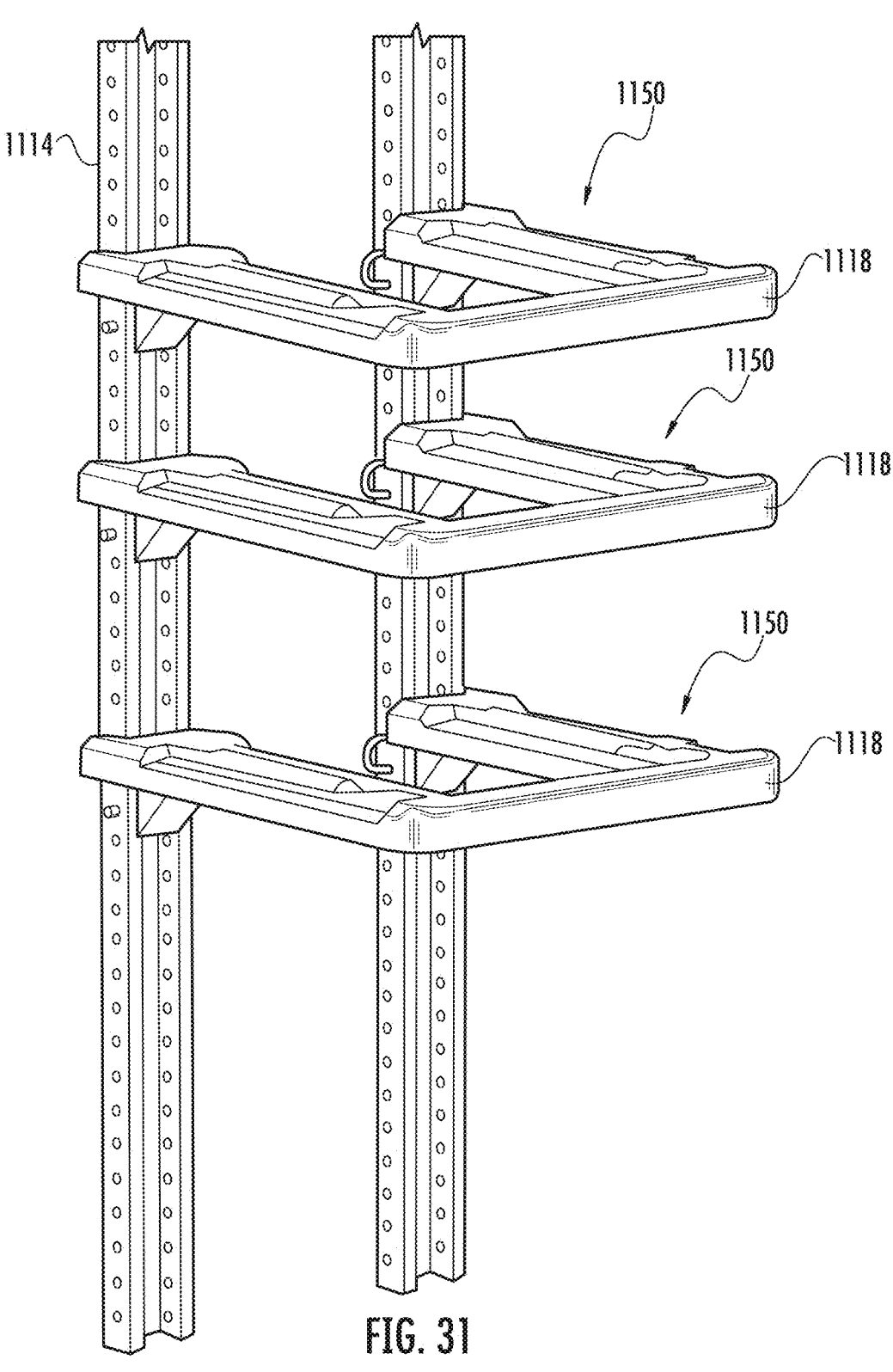

FIG. 31 is an enlarged perspective view of a portion of the shelf unit of FIG. 30.

Figure 32:
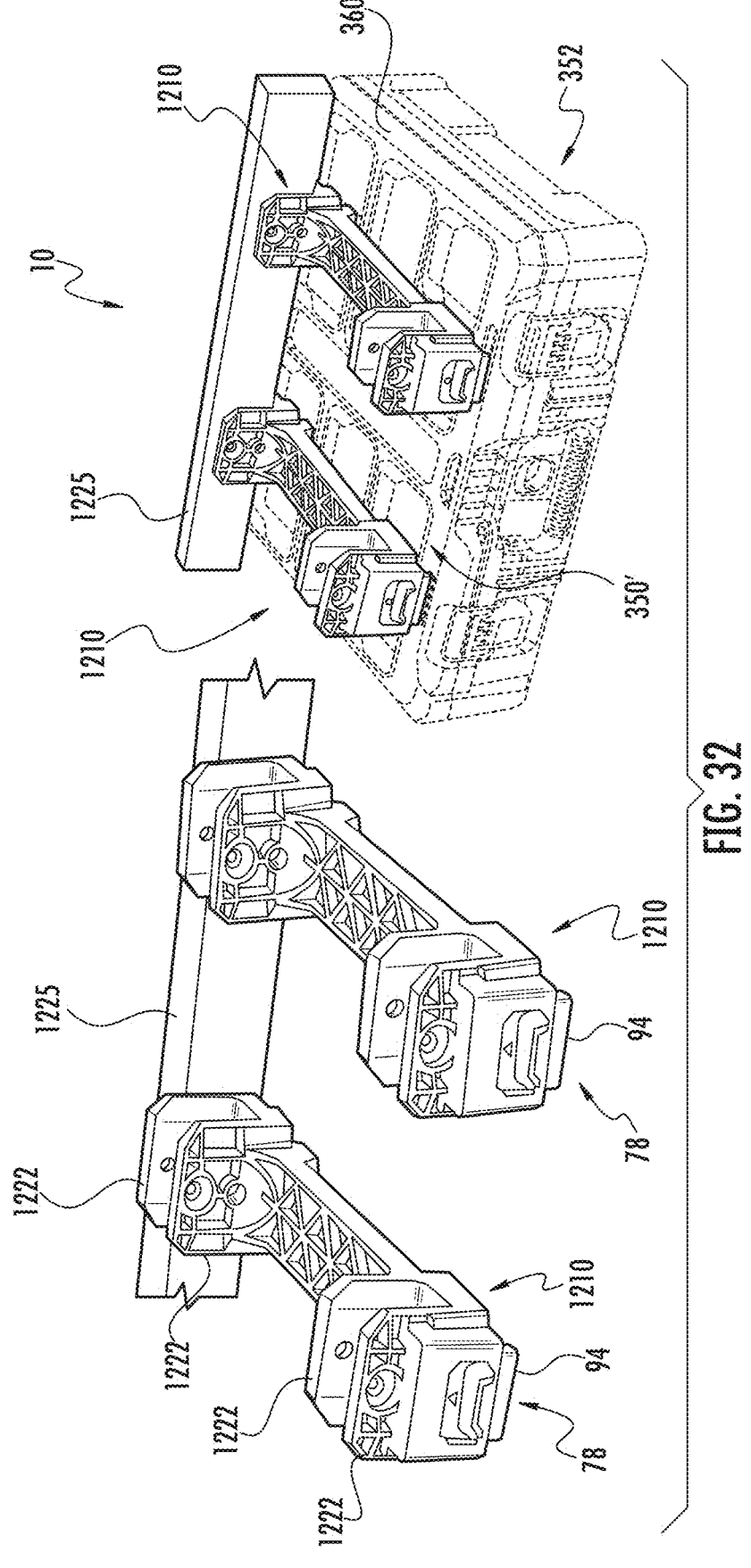

FIG. 32 illustrates a clamping rail usable with the storage device system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
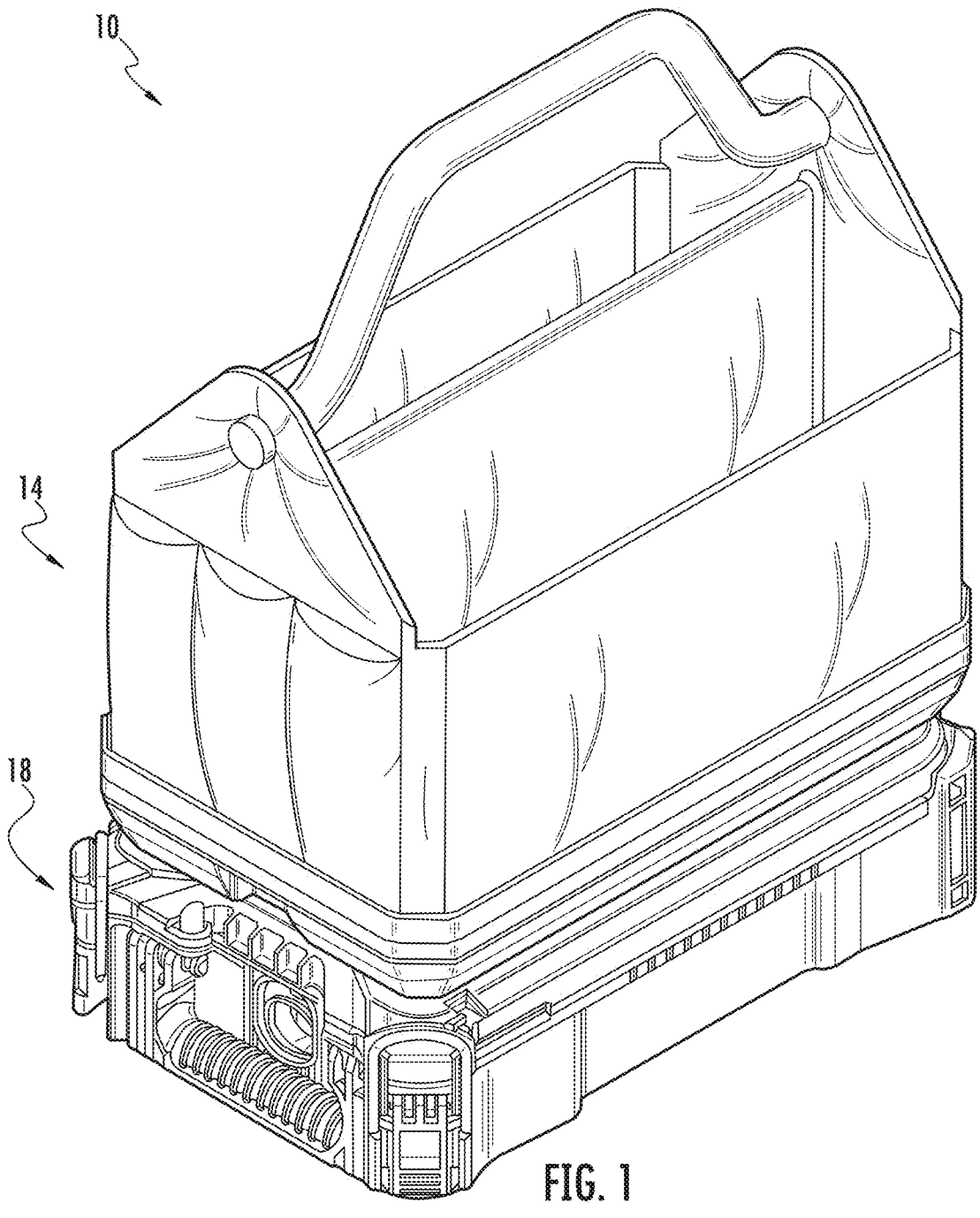
FIG. 1 is a perspective view of a storage device system including a soft-sided storage device coupled to a rigid storage device.

FIG. 1 illustrates a storage device system 10 including a soft-sided storage device 14, such as soft-sided bag, removably coupled to a hard-sided or rigid storage device 18, such as a rigid storage case (e.g., a rigid tool box or organizer).

Figure 2:
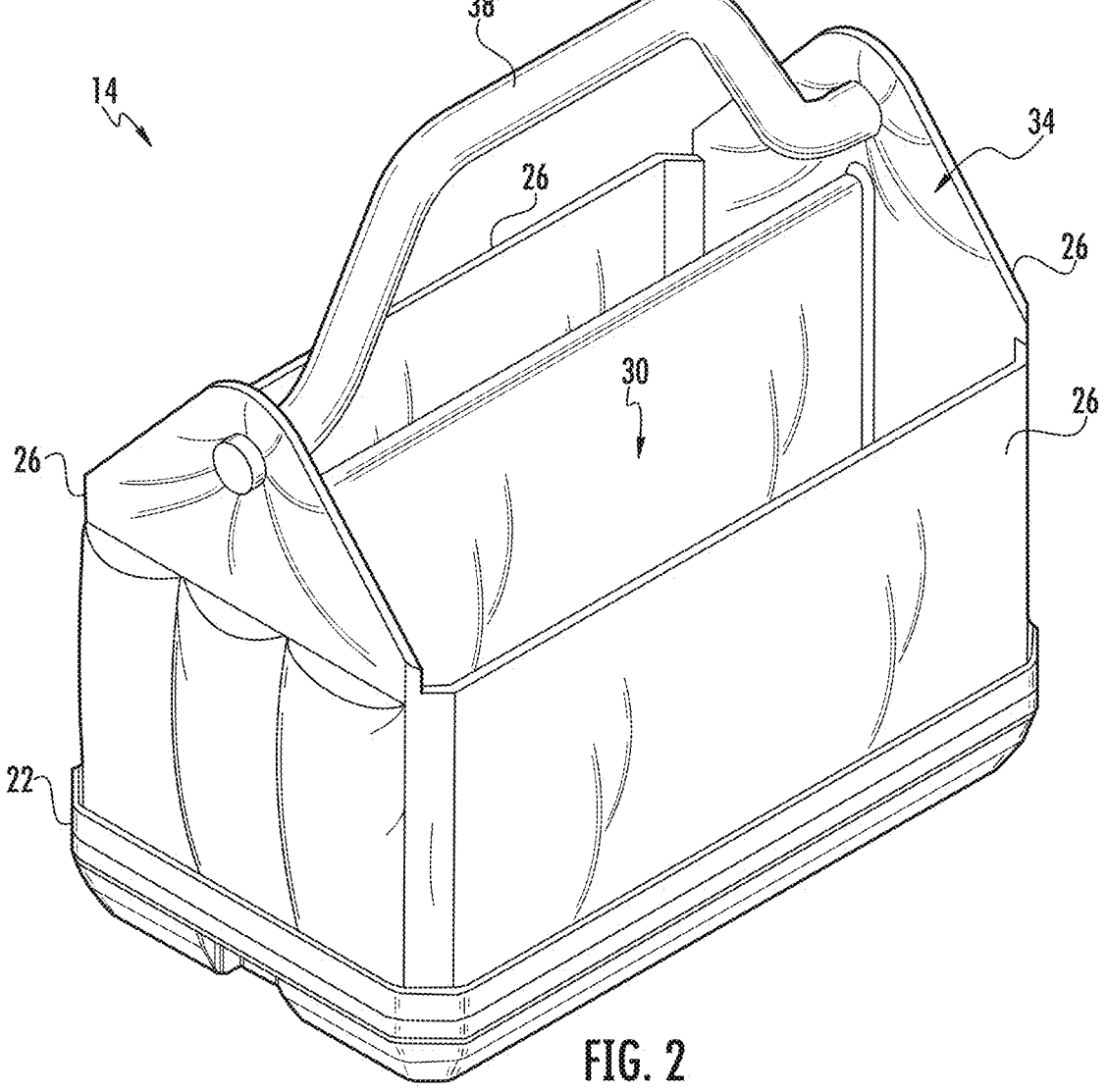
FIG. 2 is a perspective view of the soft-sided storage device of FIG. 1.
Figure 3:
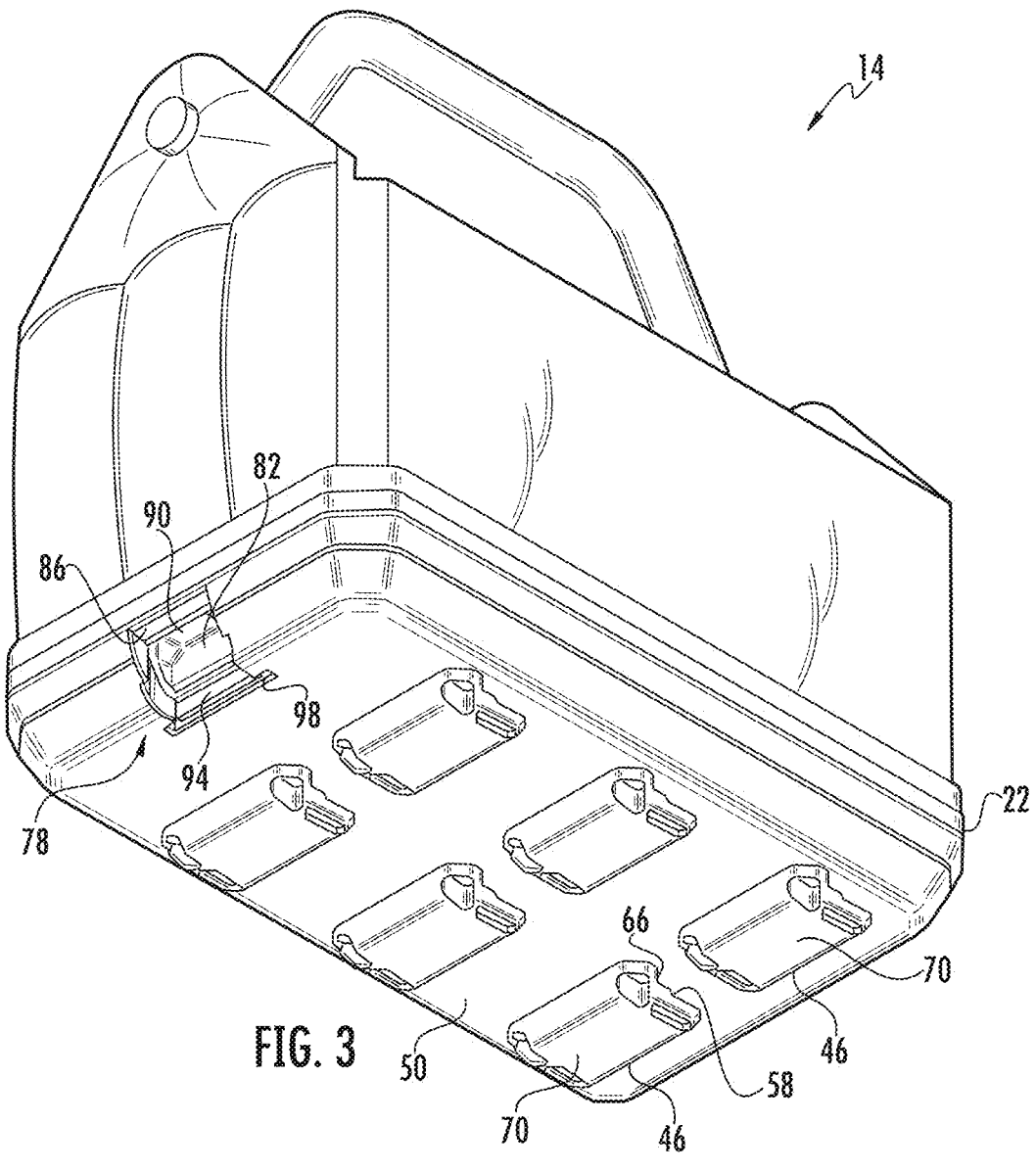
FIG. 3 is a bottom perspective view of the soft-sided storage device of FIG. 2.
Figure 4:
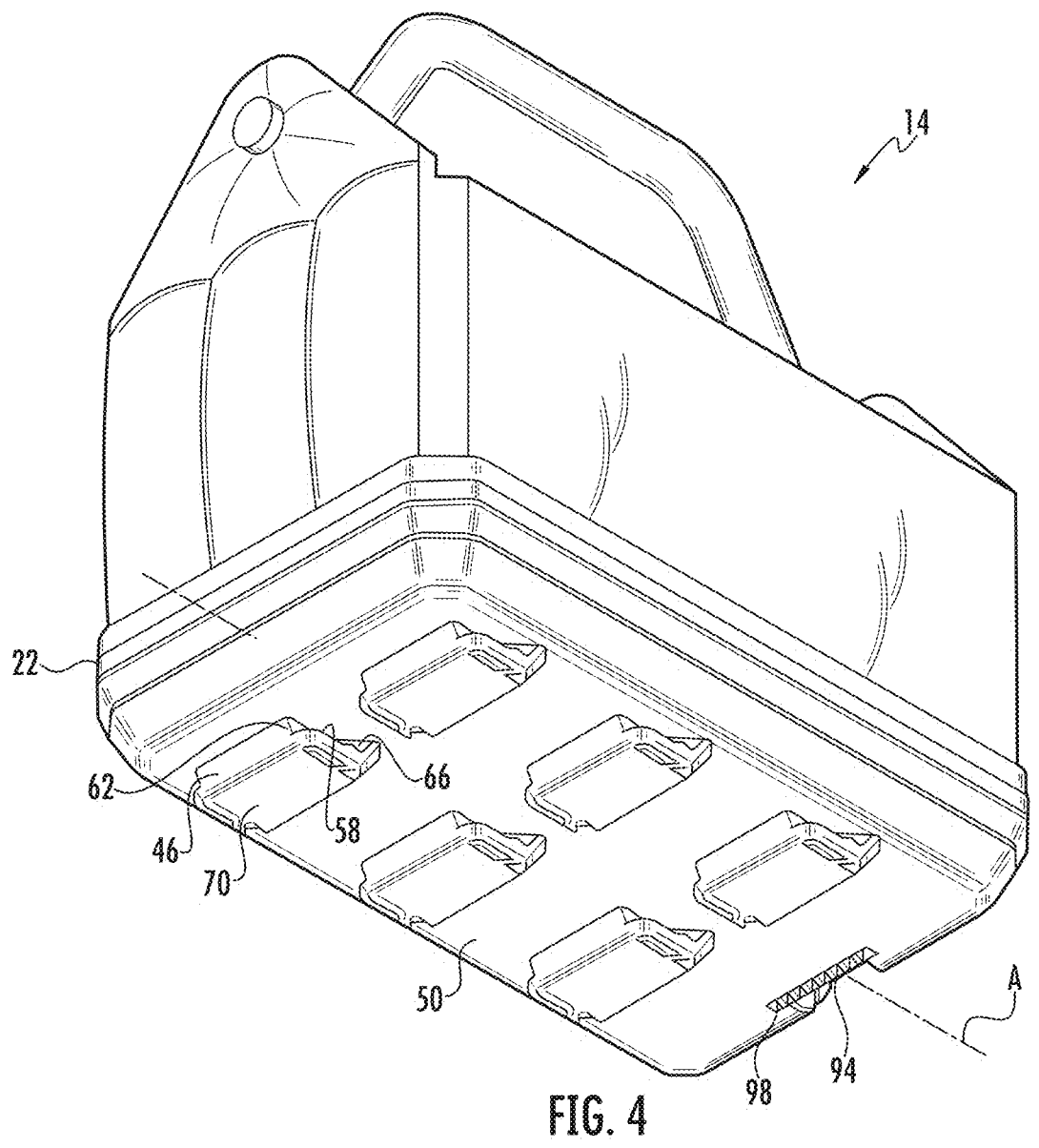
FIG. 4 is another bottom perspective view of the soft-sided storage device of FIG. 2.

With reference to FIGS. 2-4, the bag 14 includes a rigid or hard bottom member 22 (e.g., thermoform plastic, etc.) and flexible sidewalls 26 cooperating to define a storage compartment 30. The sidewalls 26 define an open top 34 for access to the storage compartment 30. A handle 38 is connected between opposite sidewalls 26 and is engageable by a user to carry the bag 14.

One or more interface or connection projections 46 are provided on the bottom member 22. In the illustrated embodiment, each projection 46 extends from a bottom surface 50 of the bottom member 22 and is configured to cooperate with a connection recess 54 (FIGS. 5-6) on the storage case 18 to interface and connect the bag 14 to the storage case 18. In the illustrated embodiment, each projection 46 is formed integrally with the bottom member 22, for example, in a thermoforming process. Each projection 46 has a channel 58 on each side of the projection 46 extending parallel to a longitudinal axis A of the bottom member 22, as best shown in FIG. 4. Each channel 58 has a front, open end 62 and a back, closed end 66 along the axis A. Each projection 46 has a planar surface 70 with a generally rectangular shape. In other embodiments, the planar surface 70 may be another shape, e.g., circular, triangular, etc. In the illustrated embodiment, there are six projections 46 arranged in three rows of two along the axis A. In other embodiments, the bag 14 may include fewer or more projections 46, and/or the projections 46 may be arranged in different patterns. The projections 46 are arranged such that the bag 14 can be supported on a surface by the projections 46 through contact with the planar surfaces 70.

The bag 14 further includes a latch assembly 78 including a latch member 82, as shown in FIG. 3. The latch assembly 78 is supported by the bottom member 22 within a latch passage 86 defined in the bottom member 22. The latch member 82 includes a grip portion 90 and an interference portion 94. The latch member 82 is slidingly movable along an axis perpendicular to the longitudinal axis A of the bottom member 22 within the latch passage 86. The interference portion 94 selectively protrudes from the latch passage 86 through a slot 98 defined in the bottom surface 50 of the

Figure 9:
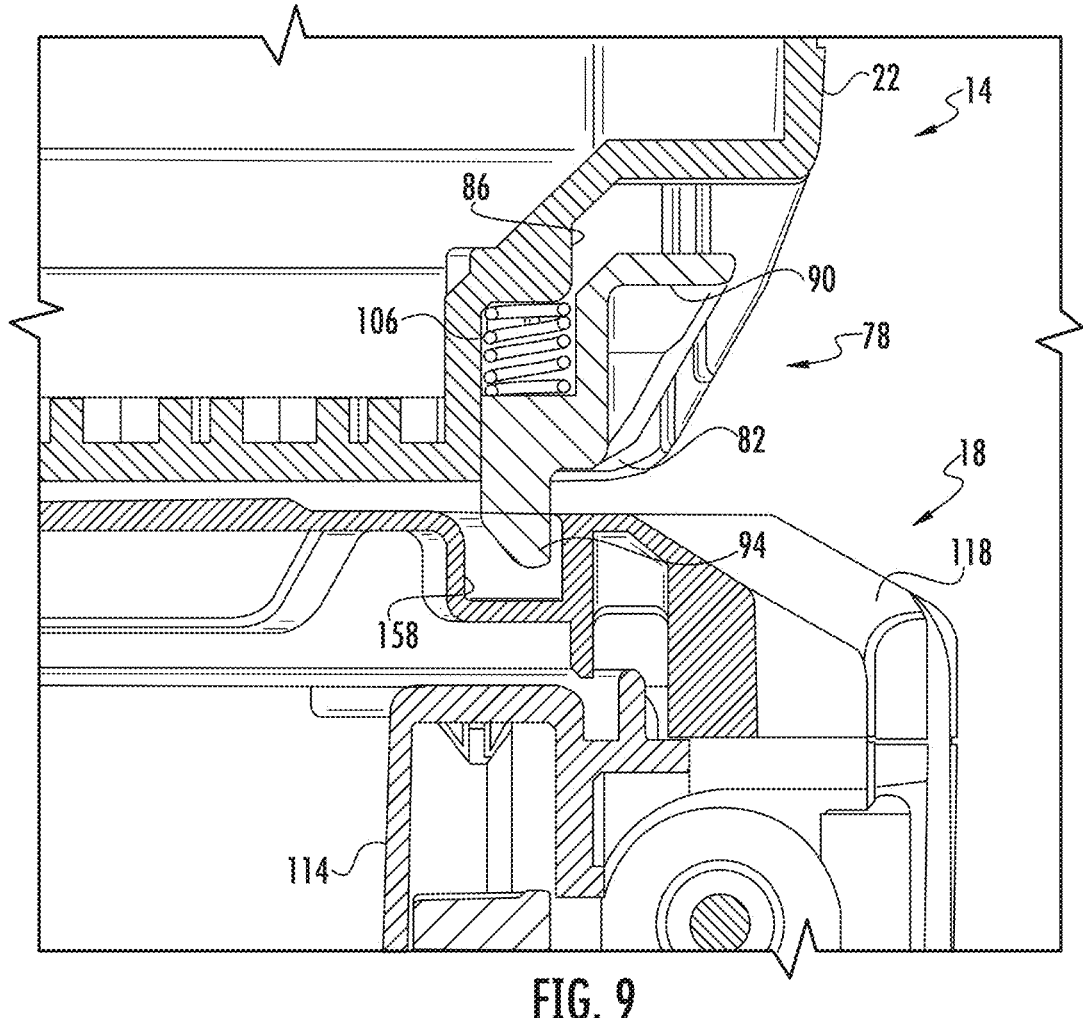
FIG. 9 is an enlarged cross-sectional view of a portion of the storage device system of FIG. 1, illustrating a latch assembly in a locking position.
Figure 10:
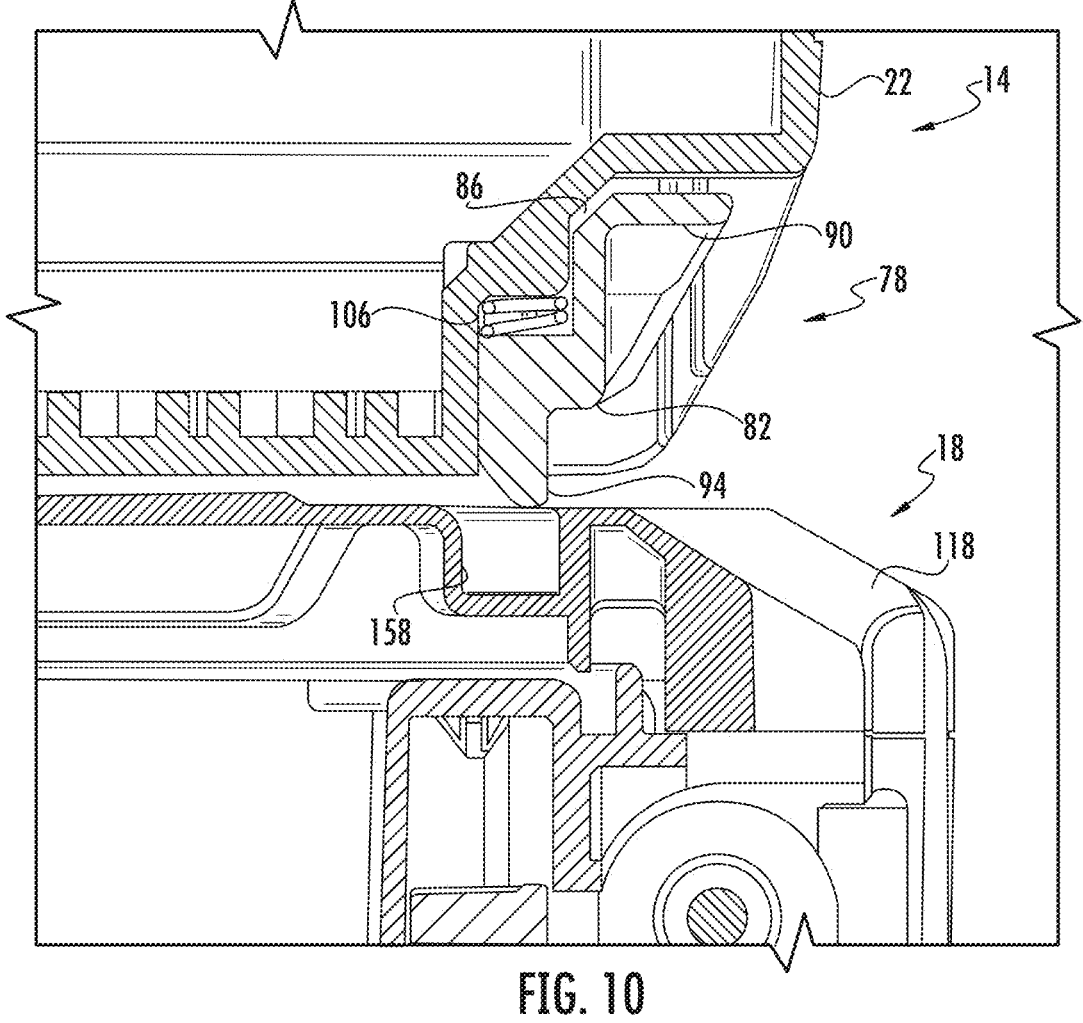
FIG. 10 is an enlarged cross-sectional view of the portion of the storage device system shown in FIG. 9, illustrating the latch assembly in an unlocking position.

4 bottom member 22. The interference portion 94 has a tapered surface 102 (FIG. 7) at a distal end thereof. The latch member 82 is movable between a first or locking position (FIG. 9) in which the interference portion 94 extends through the slot 98, and a second or unlocking position (FIG. 10) in which the interference portion 94 is retracted into the latch passage 86 and does not extend through the slot 98. The latch assembly 78 further includes a biasing member 106 (e.g., a compression spring) arranged to bias the latch member 82 into the locking position (FIG. 9). The latch member 82 may be urged against the biasing member 106 to the unlocking position (FIG. 10) by pushing on the grip portion 90. In the locking position, the interference portion 94 does not extend beyond the planar surfaces 70 of the projections 46.

Figure 5:
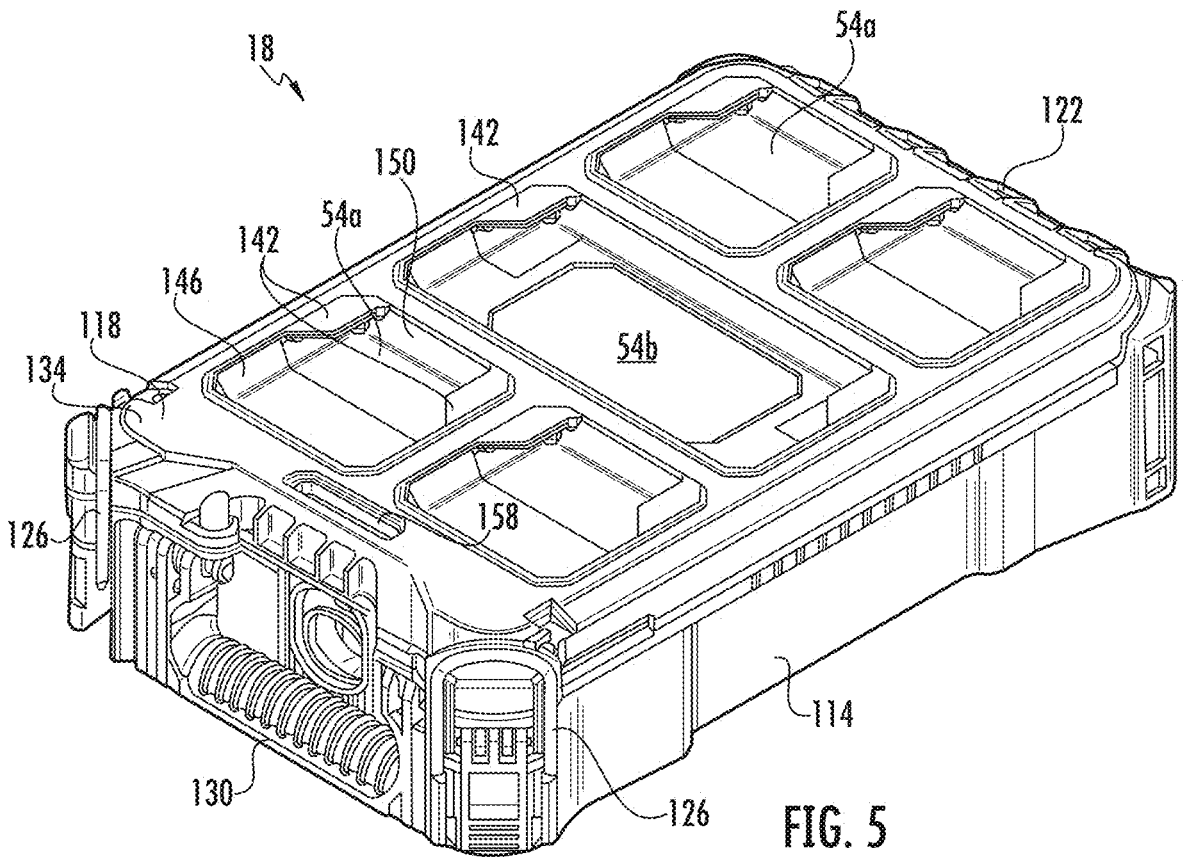
FIG. 5 is a top perspective view of the rigid storage device of FIG. 1.
Figure 6:
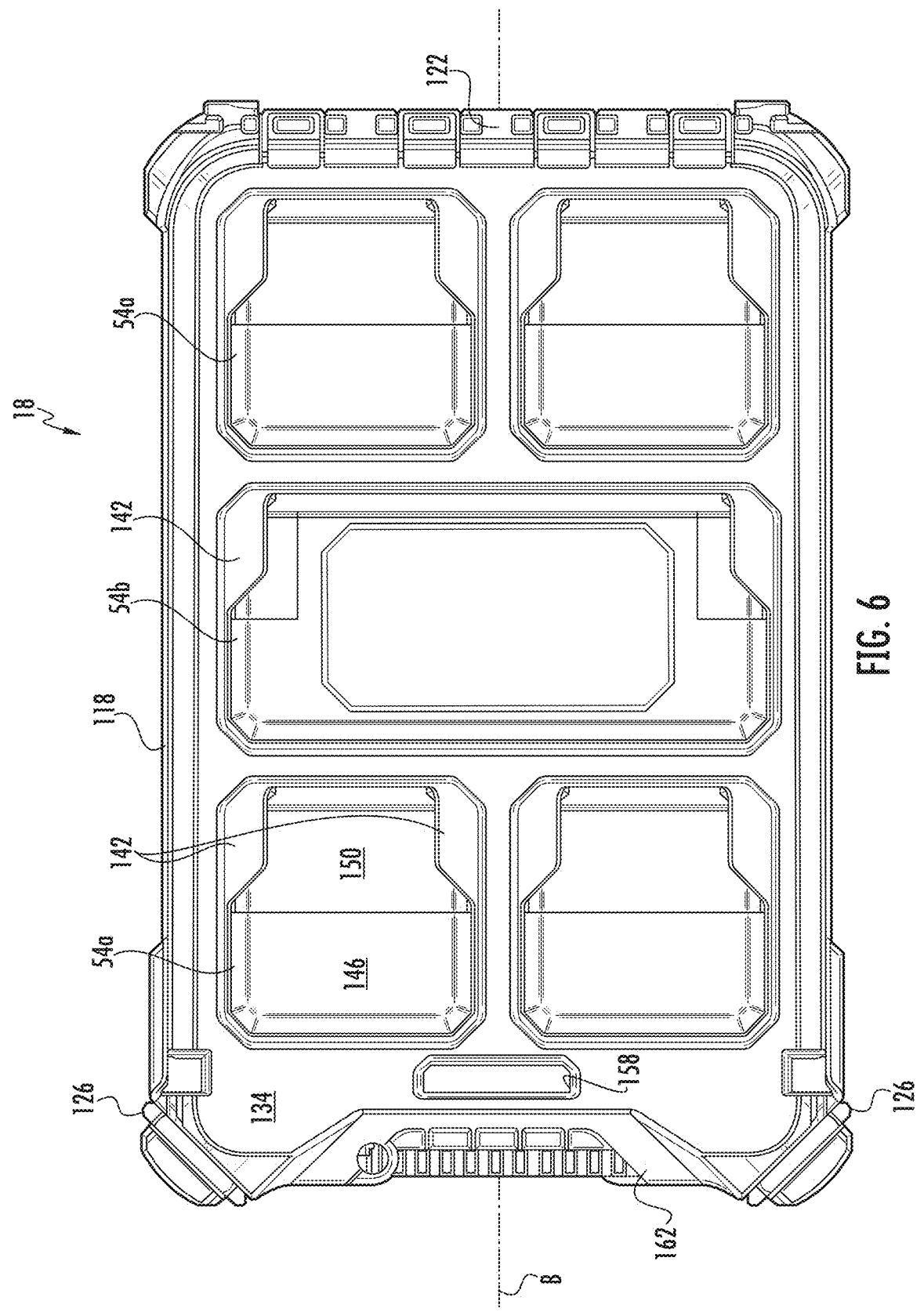
FIG. 6 is a top view of the rigid storage device of FIG. 5.
Figure 11:
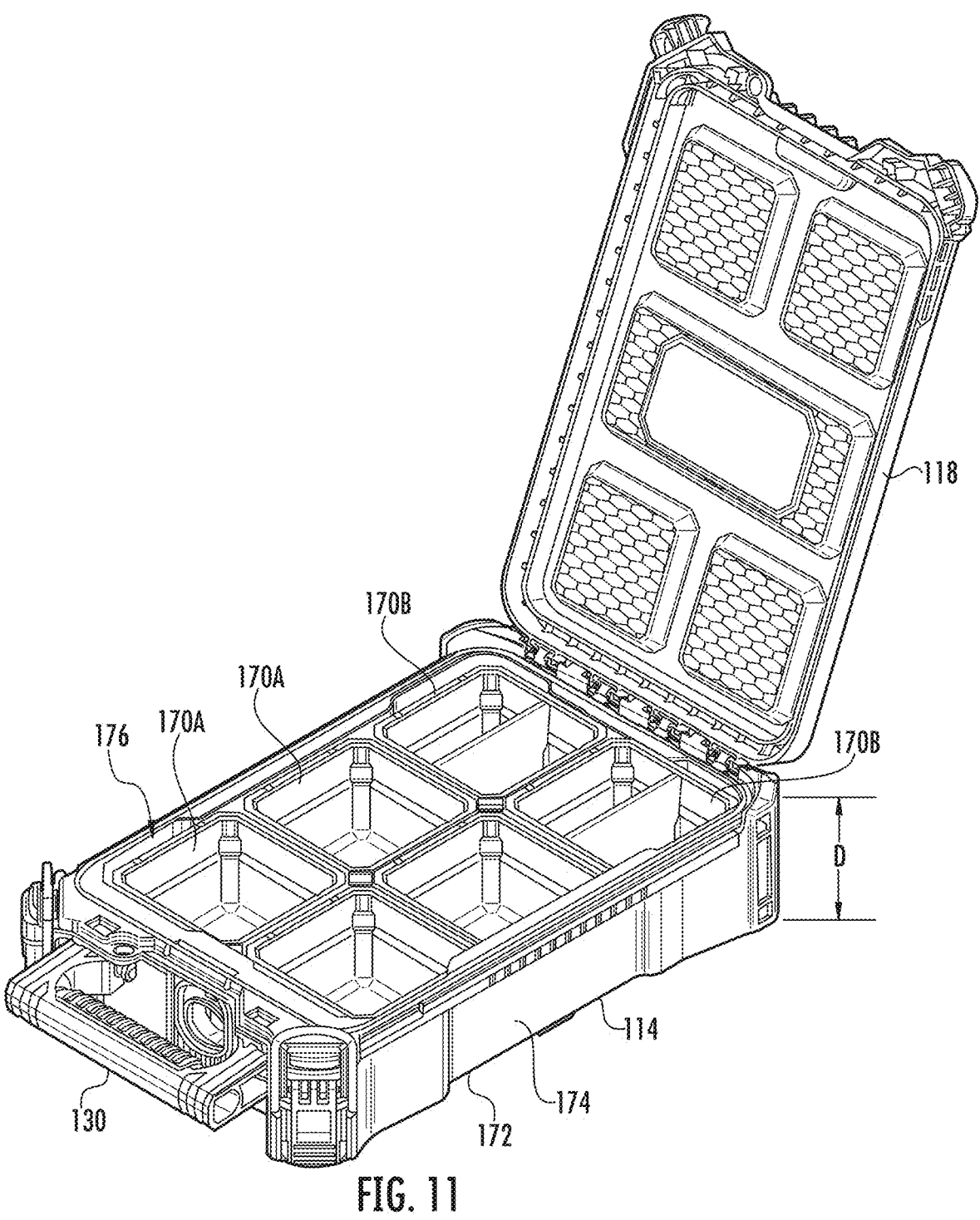
FIG. 11 is a perspective view of the rigid storage device of FIG. 5, illustrating a cover in an open position.
Figure 12:
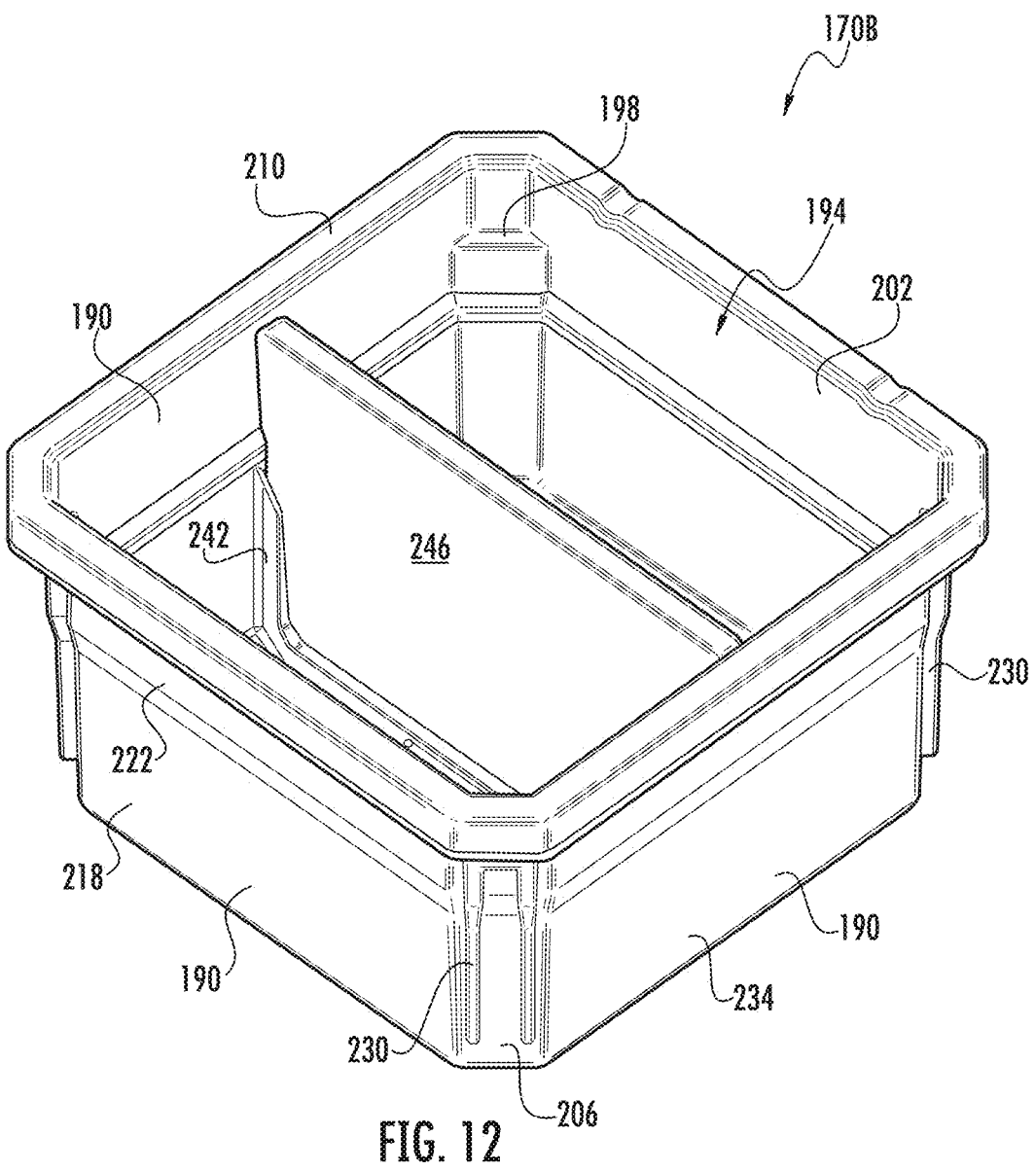
FIG. 12 is a top perspective view of a bin for use with the storage case.

With reference to FIGS. 5 and 6, the storage case 18 includes a base 114 and a top or cover 118. The cover 118 is movably coupled to the base 114 between a closed position (FIG. 5) and an open position (FIG. 11). In the illustrated embodiment, the cover 118 is pivotally coupled to the base 114 by a hinge 122. The cover 118 includes cover latches 126 to releasably secure the cover 118 in the closed position. The storage case 18 also includes a side handle 130 to facilitate independently carrying the storage case 18.

With continued reference to FIGS. 5 and 6, a top surface 134 of the cover 118 defines the connection recesses 54 that receive and cooperate with the projections 46. In the illustrated embodiment, the connection recesses 54 include two rows of two small recesses 54a corresponding to two rows of two projections 46 and one large recess 54b corresponding to a row of two projections 46. In other embodiments, the cover 118 may include different numbers of patterns of recesses 54, depending on the arrangement of the projections 46 on the bag 14. When the projections 46 are received in the connection recesses 54, the bottom surface 50 of the bottom member 22 is arranged to contact and be supported by the top surface 134 of the cover 118.

Figure 7:
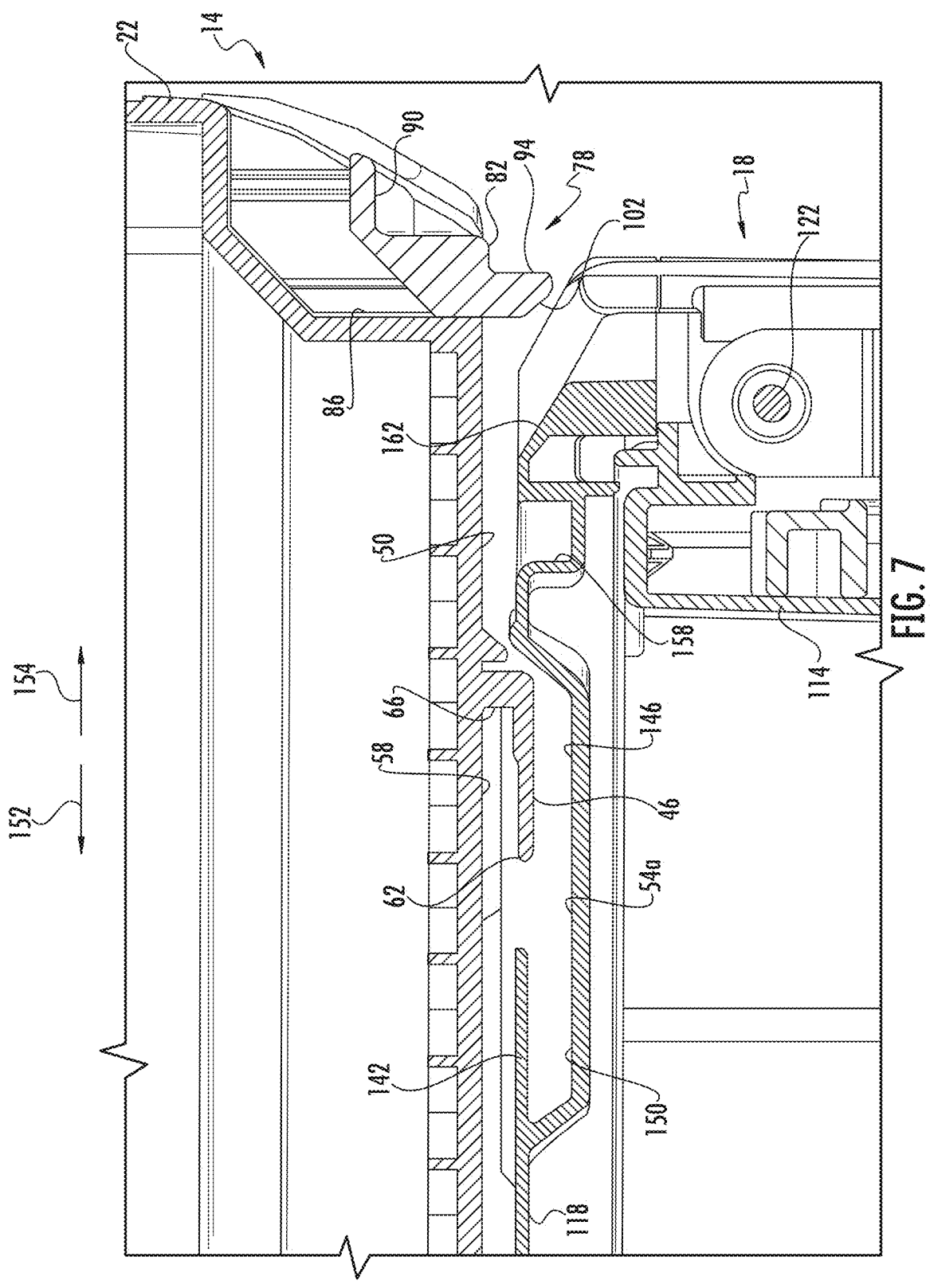
FIG. 7 is an enlarged cross-sectional view of a portion of the storage device system of FIG. 1, illustrating a bottom of the soft-sided storage device disengaged from a top of the rigid storage device.
Figure 8:
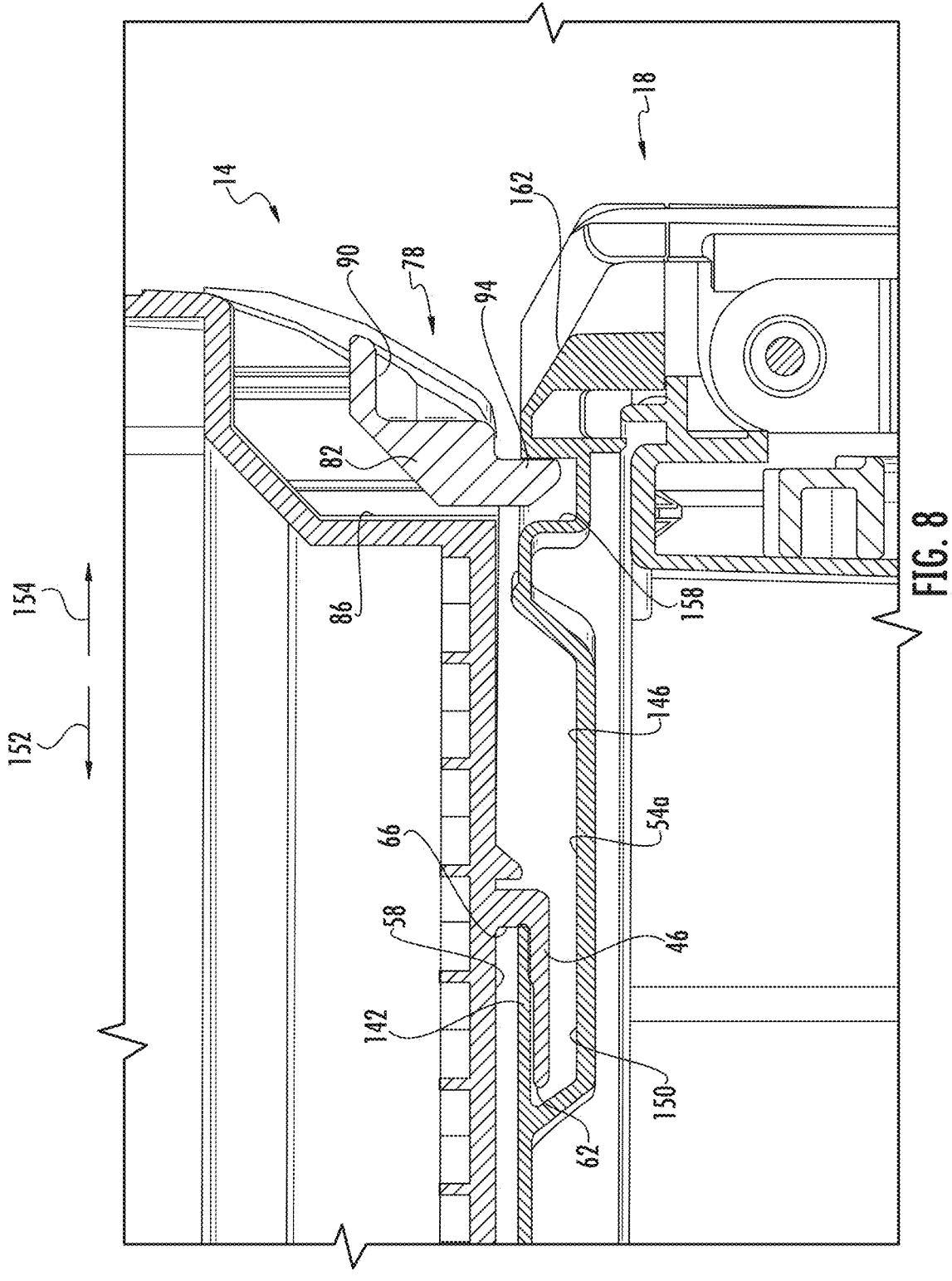
FIG. 8 is an enlarged cross-sectional view of the portion of the storage device system shown in FIG. 7, illustrating the bottom of the soft-sided storage device engaged with the top of the rigid storage device.

An interference projection or wing 142 extends into each connection recess 54 parallel to a longitudinal axis B of the cover 118 on opposite sides of the connection recess 54 from one end of the connection recess 54. Each of the wings 142 corresponds to and is configured to cooperate with a corresponding one of the channels 58 of the projection 46 received by the respective connection recess 54. Each of the wings 142 has a length that extends approximately half the connection recess 54 to define a first portion 146 of the connection recess 54 and a second portion 150 opposite the wings 142, which remains open. The second portion 150 of each connection recess 54 is sized to receive one of the projections 46 generally perpendicular to the longitudinal axis B into a first, disconnected position (FIG. 7). In the disconnected position, the projections 46 are oriented within the connection recesses 54 such that the open ends 62 of the channels 58 are nearer to the wings 142 than the closed ends 66. Once in the disconnected position, the bottom member 22 may be slid relative to the cover 118 parallel the longitudinal axes A, B in a first direction 152 toward the wings 142 such that the wings 142 are received within the channels 58 in a second, interfaced or connected position (FIG. 8). The wings 142 and the projections 46 engage within the connection recesses 54 to interface and connect the bottom member 22 with the cover 118 and prevent disconnection of the bottom member 22 from the cover 118, except in a second direction 154 opposite the first direction 152 and generally parallel to the longitudinal axes A, B. The wings 142 and the channels 58 engage one another perpendicular to the longitudinal axes A, B (i.e., perpendicular to the top surface 134 of the cover 118 and the bottom surface 50 of the bottom member 22) when carrying the bag 14 and the storage case 18 as a single unit via the handle 38 of the bag 14 (see FIG. 1).

With continued reference to FIGS. 5 and 6, the top surface 134 of the cover 118 further defines an interference or locking aperture 158. In the illustrated embodiment, the locking aperture 158 is located at one end of the cover 118. The end of the cover 118 has a sloped surface 162 adjacent the locking aperture 158. The locking aperture 158 is elongate and extends transverse to the longitudinal axis B of the cover 118 parallel to a short side of the cover 118. The locking aperture 158 is located such that when the bottom member 22 and the cover 118 are in the connected position, the locking aperture 158 is aligned with the interference portion 94 of the latch member 82. The locking aperture 158 is sized to receive and engage the interference portion 94 when the latch member 82 is in the locking position (FIG. 9). When the interference portion 94 is engaged with the locking aperture 158 in the locking position, the latch member 82 obstructs movement of the bottom member 22 relative to the cover 118 from the connected position to the disconnected position in the second direction 154, thereby inhibiting disconnection of the bag 14 from the storage case 18. In particular, the interference portion 94 interferes with the cover 118 within the locking aperture 158 such that the wings 142 cannot be removed from the channels 58 of the projections 46 in the second direction 154.

A user may couple the soft-sided bag 14 to the rigid storage case 18 to carry as a coupled unit by first, inserting the connection projections 46 of the bottom member 22 in a direction perpendicular to the cover 118 and into the second portion 150 of the connection recesses 54 of the cover 118 such that the cover 118 supports the bag 14 in the disconnected position (FIG. 7). The bottom member 22 and the cover 118 are oriented such their longitudinal axes A, B are parallel, and the latch assembly 78 is nearest the end of the cover 118 defining the locking aperture 158. The bag 14 (i.e., the bottom member 22) is then manually slid in the first direction 152 such that the wings 142 are received in the channels 58 through the open end 62 of the channels 58 until the wings 142 abut the closed end 66 of the channels 58 in the connected position (FIG. 8). As the bottom member 22 slides relative to the cover 118 from the disconnected position to the connected position, the latch member 82, which is biased into the locking position (FIGS. 7 and 9) by the biasing member 106, is urged into the unlocking position (FIG. 8) by the sloped surface 162 of the cover 118 until aligned with the locking aperture 158 when in the connected position. The biasing member 106 then automatically biases the latch member 82 back into the locking position (FIG. 9) in which the interference portion 94 is received in and engages the locking aperture 158. Alternatively, a user may urge the latch member 82 into the unlocking position (FIG. 10) by pushing on the grip portion 90 upwardly against the biasing force of the biasing member 106. The user holds the latch member 82 in the unlocking position while sliding the bag 14 in the first direction 152 from the disconnected position to the connected position. Once in the connected position (FIG. 10), the user may release the latch member 82, thereby allowing the latch member 82 to be biased into the locking position where the interference portion 94 is received in and engages the locking aperture 158. The interference portion 94 of the latch member 82 extends into the locking aperture, thereby inhibiting relative movement of the bag 14 and the storage case 18 in the second direction 154 parallel to the longitudinal axes A, B. Accordingly, the latch assembly 78 and the locking aperture 158 cooperate to secure the soft-sided bag 14 and the rigid storage case 18 in the connected position as a unit to be carried by the handle 38 of the bag 14. The handle 38 is positioned such that when the bag 14 and the storage case 18 are coupled as a unit, the handle 38 is above a center of gravity of the coupled unit.

When the soft-sided bag 14 and the rigid storage case 18 are coupled together, the user may quickly decouple them to carry or access each of the storage devices 14, 18 separately. The user first urges the latch member 82 into the unlocking position (FIG. 10) by pushing on the grip portion 90 upwardly against the biasing force of the biasing member 106. While holding the latch member 82 in the unlocking position, the user then slides the bag 14 relative to the cover 118 in the second direction 154 along the longitudinal axes A, B from the connected position (FIG. 8) to the disconnected position (FIG. 7). The wings 142 disengage from the channels 58 and the projections 46 are moved into the second portion 150 of the connection recesses 54, allowing the bag 14 to be disconnected in a direction away from and perpendicular to the top surface 134 of the cover 118.

The latch assembly 78 is dimensioned and constructed to be movable between the locking and unlocking positions to couple the bag 14 to the cover 118. The latch assembly 78 does not interfere with opening the storage case 18 so that the storage case 18 on the bottom will still be able to be opened with the soft-sided bag 14 attached to the cover 118.

It should be understood that, in other constructions, multiple latch assemblies 78 and corresponding locking apertures 158 may be provided on the bag 14 and the storage case 18. Such an arrangement may, for example, provide an increased connection between the storage devices 14, 18, balance or reduce the load on a given latch assembly, etc.

It should also be understood that, in other constructions, the latch assembly 78 and the locking aperture 158 may be reversed (e.g., the movable latch member 82 and the biasing member 106 may be supported on the cover 118 or the base 114 of the storage case 18, and the locking aperture 158 may be defined by the bottom member 22 of the bag 14). Additionally or alternatively, the relative locations of the projections 46 and the recesses 54 may be reversed (e.g., the projections 46 may extend from the cover 118 of the storage case 18, and the recesses 54 may be formed in the bottom member 22 of the soft-sided bag 14).

As shown in FIG. 1, the storage devices 14, 18 have approximately the same perimeter dimensions. There is one pair of latch assembly 78 and locking aperture 158 at one end of the storage devices 14, 18. However, in alternate embodiments, the storage devices 14, 18 may have different perimeter dimensions (e.g., the bag 14 is shorter than the storage case 18). In such embodiments, the bag 14 may have fewer projections 46 arranged such that the bag 14 may be connected to the storage case 18 in substantially the same manner as described above, except where one or more of the connection recesses 54 in the cover 118 does not receive a projection 46. Additionally or alternatively, in some embodiments multiple soft-sided bags 14 having smaller dimensions than the storage case 18 may be simultaneously connected to the storage case 18.

As shown in FIG. 11, a plurality of bins 170A, 170B, or inserts, are positioned within the base 114. The base 114 includes a bottom wall 172 and sidewalls 174 extending from the bottom wall defining an interior 176 with a depth D. The bins 170A, 170B are independently removable from the storage case 18 when the storage case 18 is open (i.e., the cover 118 is in the open position), as shown in FIG. 11. The bins 170A, 170B include relatively tall, or deep, bins 170A

Figure 13:
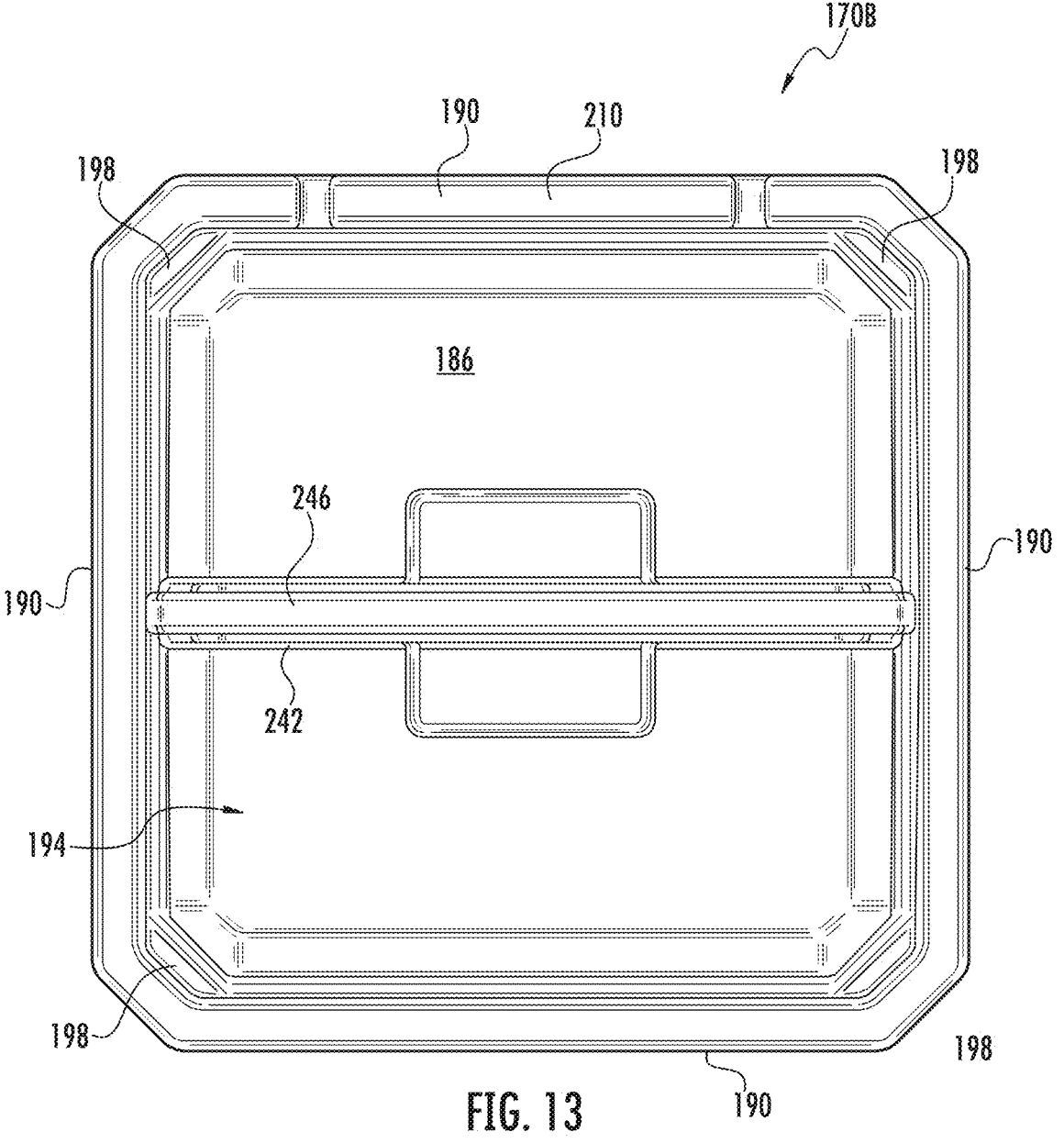
FIG. 13 is a top view of the bin of FIG. 12.

(FIG. 18) and relatively short, or shallow, bins 170B (FIGS. 12-17). The illustrated bins 170A, 170B are generally composed of plastic, but may alternatively be made of other materials. Each of the illustrated bins 170A, 170B is generally square in shape when viewed from above (FIG. 13). In other embodiments, the bins 170A, 170B may have other shapes (e.g., triangular, octagonal, circular, etc.). In the illustrated embodiment, the bins 170A, 170B are arranged within the base 114 as a grid of six (i.e., three rows of two). In other embodiments, the base 114 may be shaped and sized to receive a larger or smaller number of bins, and/or the bins 170A, 170B may be arranged within the base 114 in other patterns.

Figure 14:
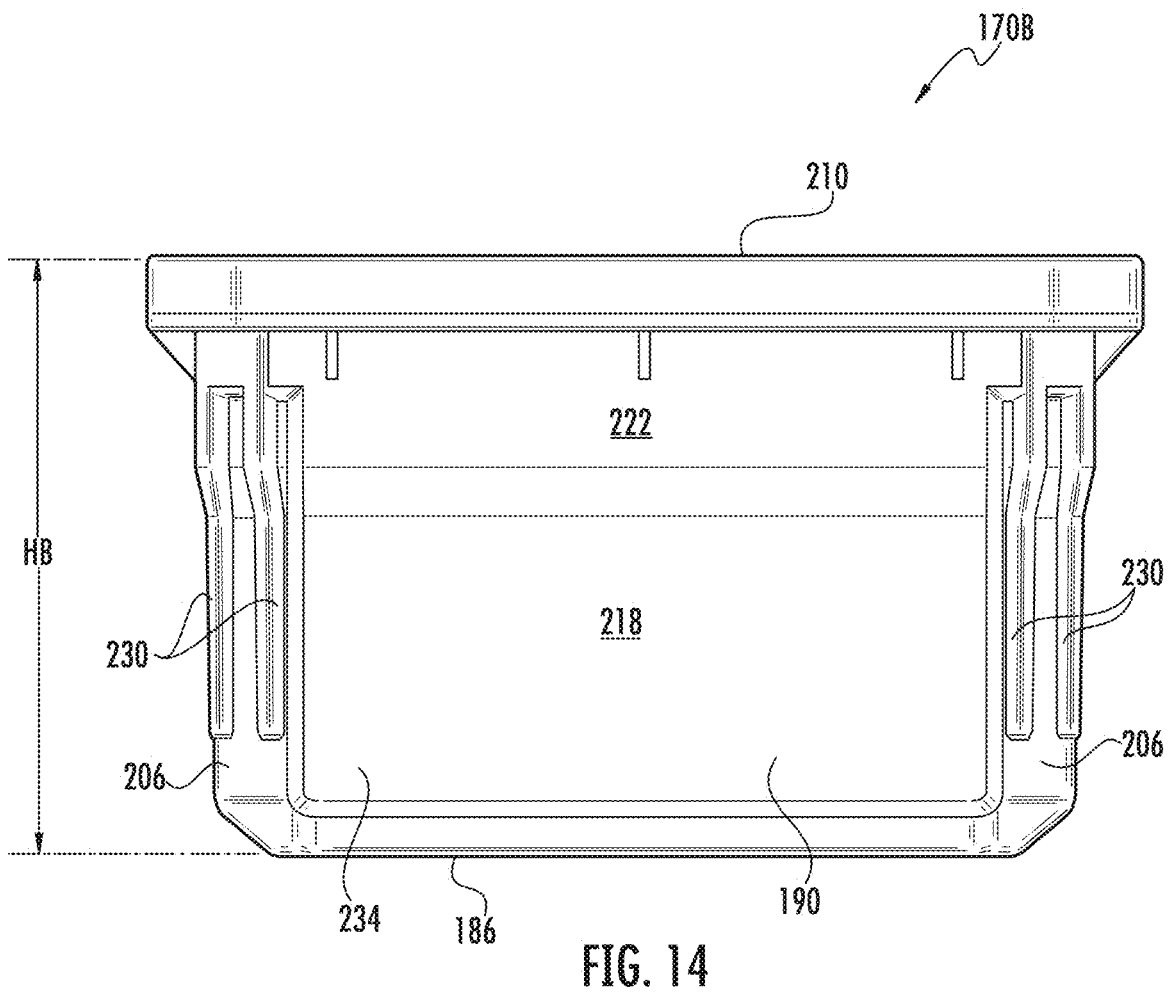
FIG. 14 is a side view of the bin of FIG. 12.
Figure 15:
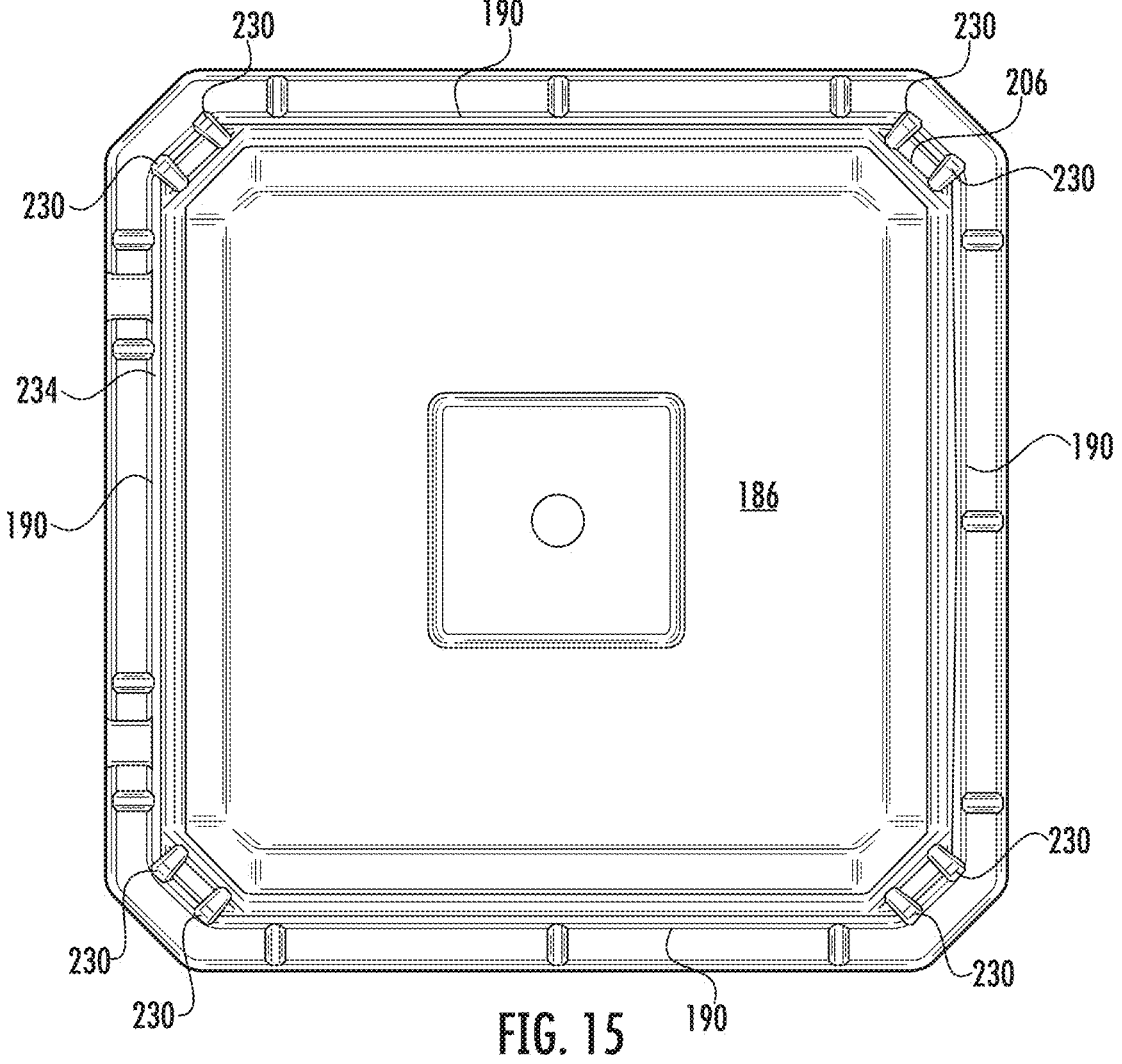
FIG. 15 is a bottom view of the bin of FIG. 12.

FIGS. 12-16 illustrate one of the relatively short bins 170B in detail. The bin 170B includes a bottom wall 186 and four sidewalls 190 extending generally perpendicularly from the bottom wall 186. The bottom wall 186 and the sidewalls 190 define a storage recess or space 194. Each of the relatively short bins 170B has a height HB (FIG. 14).

Figure 17:
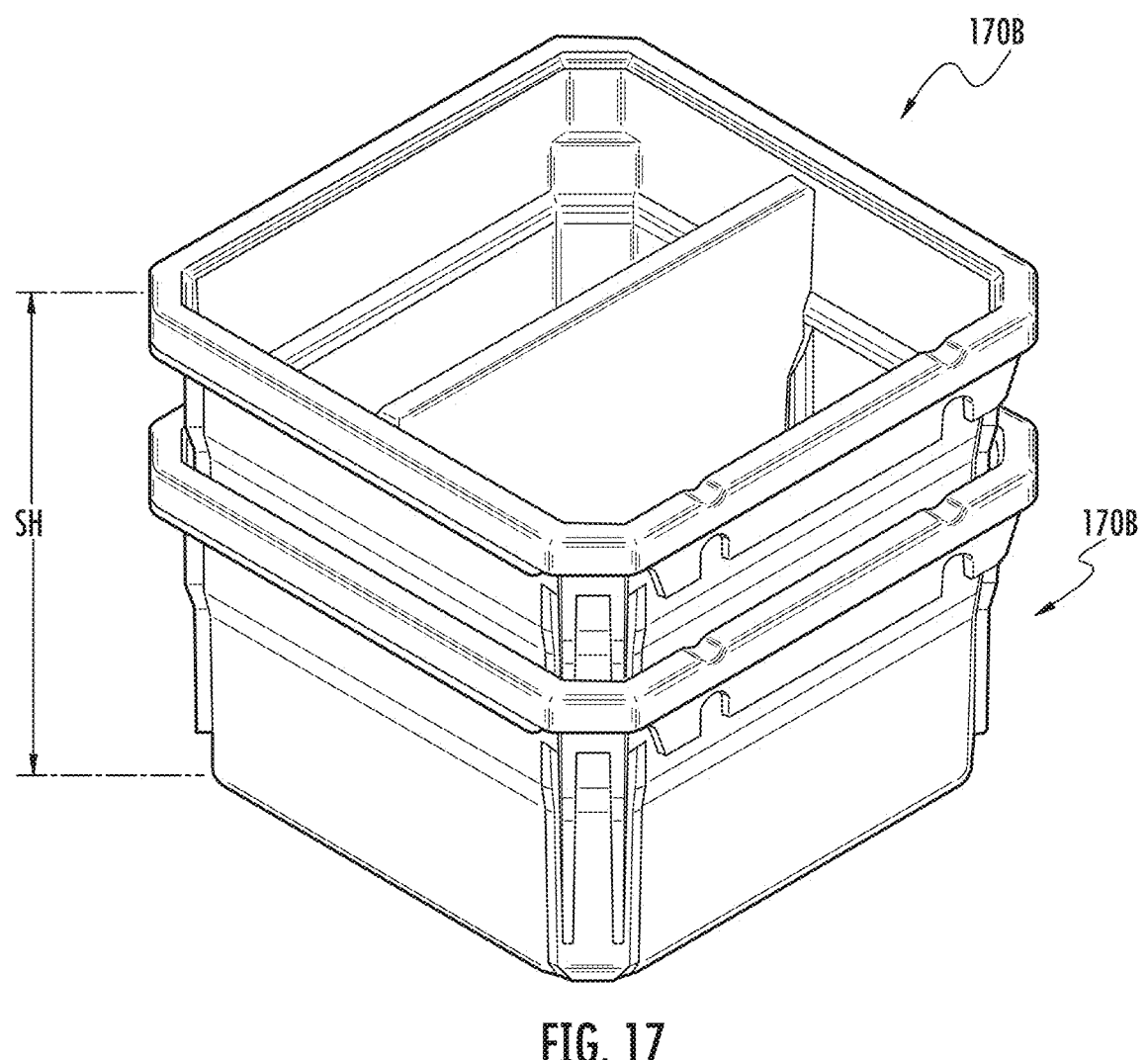
FIG. 17 illustrates two relatively short bins stacked on top of one another.

The bin 170B also includes ledges 198 formed on an inner surface 202 of the bin 170B at each corner 206 between adjacent sidewalls 190. The ledges 198 are positioned at a depth below a top edge 210 of the sidewalls 190 and a height above the bottom wall 186. In the illustrated embodiment, the ledges 198 are located at a depth that is approximately a quarter of the height HB below the top edge 210. In some embodiments the ledge 198 may extend around the perimeter of the sidewalls 190. The ledges 198 are configured to engage and support another bin when, for example, two relatively short bins 170B are stacked together, as best shown in FIG. 17. The bottom wall 186 at each corner 206 of the upper bin 170B is supported on each ledge 198 of the lower bin 170B. Each of the sidewalls 190 includes a lower, first portion 218 and an upper, second portion 222 that are stepped such that the first portion 218 has a smaller outer dimension than the second portion 222. As such, the sidewalls 190 of the upper bin 170B are partially received in the storage space 194 of the lower bin 170B up to the ledges 198 of the lower bin 170B. When stacked, the two relatively short bins 170B have a stacked height SH (FIG. 17). In other embodiments, more than two bins 170B may be stacked. Due to the top bin 170B being partially received in the bottom bin 170B, the stacked height SH is less than the total height of the two bins 170B (i.e., two times the height HB of the bins 170B).

The bin 170B further includes ribs 230 formed on an outer surface 234 of the bin 170B at the corners 206 between adjacent sidewalls 190. Each of the ribs 230 protrudes outwardly from the outer surface 234 and extends down from the top edge 210 toward the bottom wall 186. In the illustrated embodiment, each of the corners 206 has two ribs 230. In some embodiments, ribs may be formed on the sidewalls 190 between the corners 206 in addition to or in place of the ribs 230 formed at the corners 206.

Figure 19:
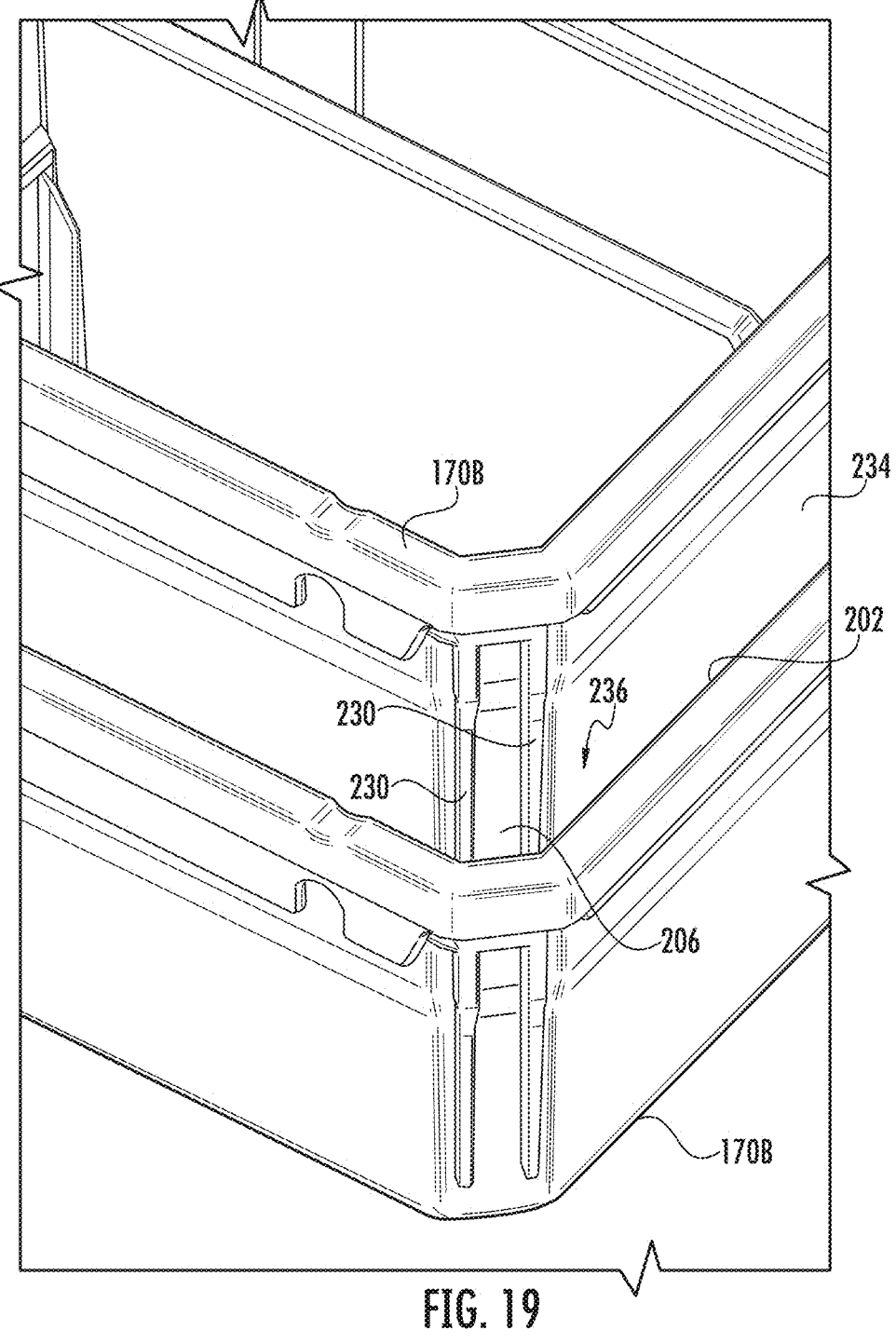
FIG. 19 is an enlarged view of portions of the two relatively short bins of FIG. 17 stacked together.

As best shown in FIG. 19, when two or more bins 170B are stacked, the ribs 230 protrude from the outer surface 234 of the upper bin 170B to contact and engage the inner surface 202 of the lower bin 170B to space apart the sidewalls 190 of the stacked bins 170B. Accordingly, the ribs 230 help maintain a space or gap 238 between the stacked bins 170B for airflow, thereby inhibiting the stacked bins 170B from getting stuck together due to vacuum effects. In other words, the gap 238 provides fluid communication between a cavity formed between the inner surface 202 of the lower bin 170B and the outer surface 234 of the bin 170B below the ledge 198 of the lower bin 170B and atmosphere, thereby inhibiting a vacuum from forming when the bins 170B are stacked.

Figure 16:
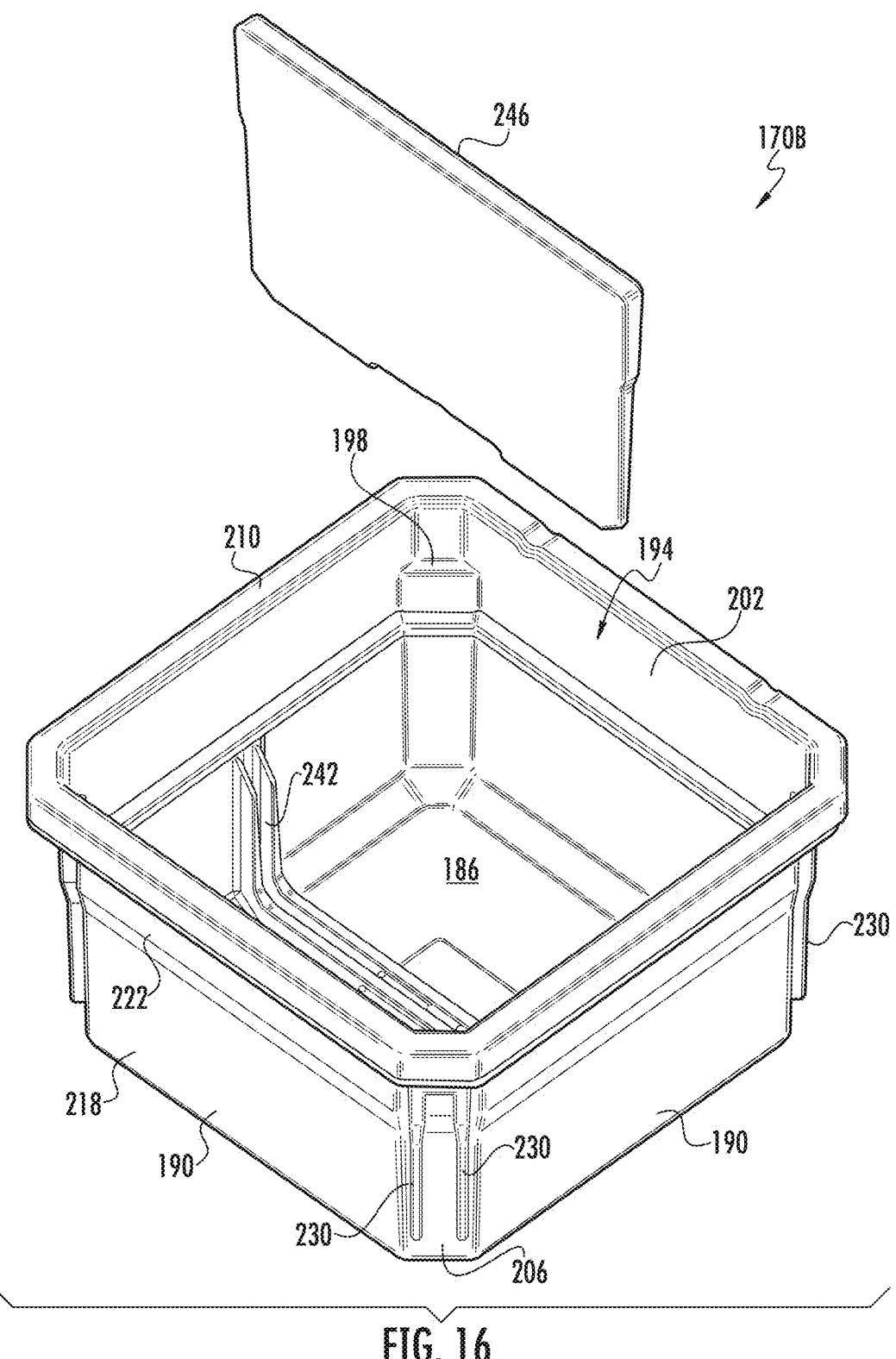
FIG. 16 is an exploded perspective view of the bin of FIG. 12.

In some embodiments, such as the illustrated embodiment, the bin 170B includes a track 242 formed on the inner surface 202 of the bin 170B, as best shown in FIG. 16. The track 242 extends partially along two opposing sidewalls 190 and along the bottom wall 186. The track 242 is configured to removably receive a dividing wall 246, or partition, for dividing the storage space 194 into separate compartments. The illustrated dividing wall 246 splits the storage space 194 in half. In other embodiments, the track 242 and the dividing wall 246 may be positioned to split the storage space 194 into unequally sized compartments, or the bin 170B may include multiple tracks for receiving multiple dividing walls. In some embodiments, the track 242 and the dividing wall 246 may be omitted. In the illustrated embodiment, the height of the dividing wall 246 inhibits a bin 170B from being stacked on a bin 170B with a dividing wall 246. In other embodiments, the dividing wall 246 may have a height that does not interfere with stacking the bins 170B.

Figure 18:
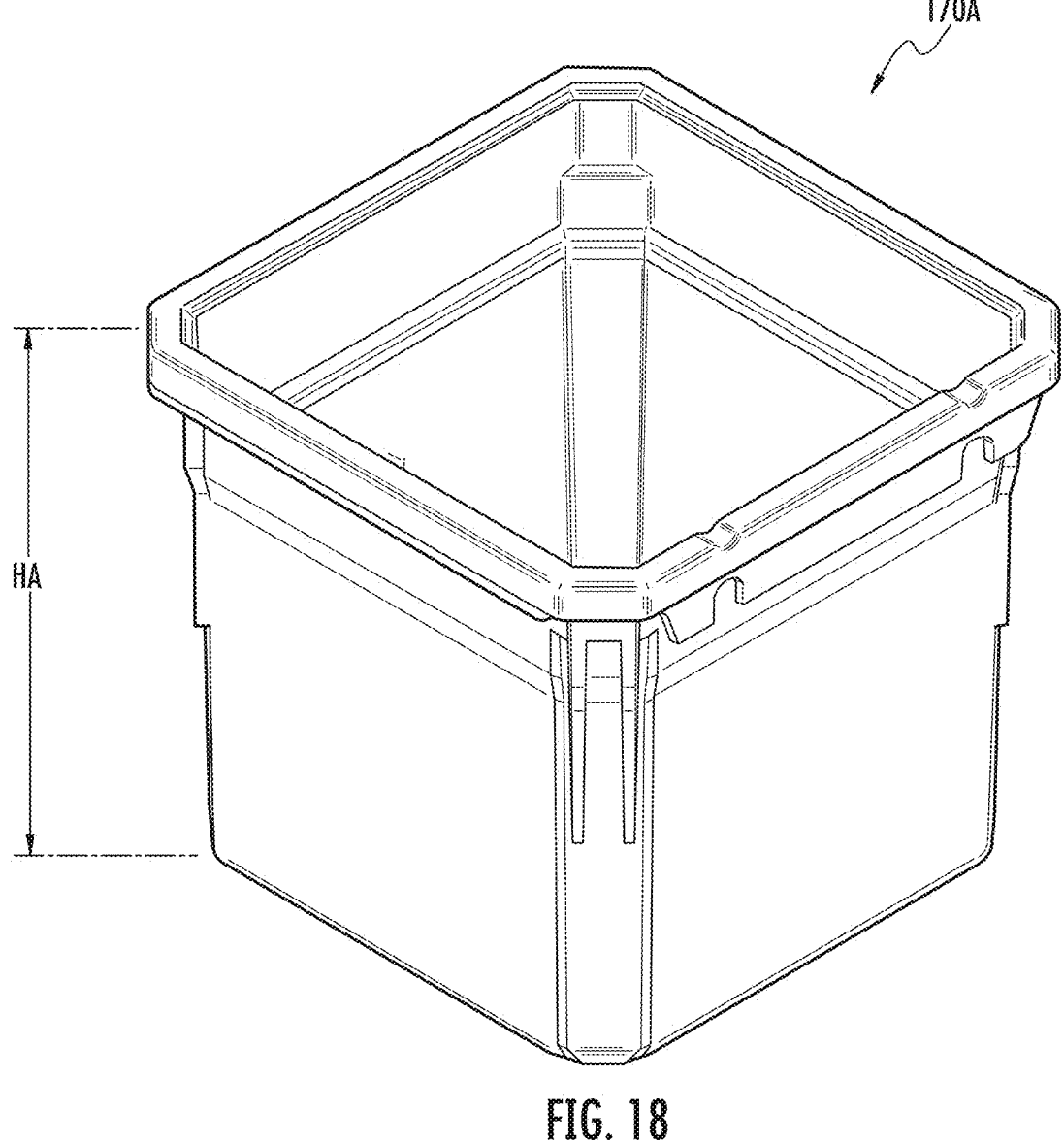
FIG. 18 illustrates a relatively tall bin.

FIG. 18 illustrates one of the relatively tall bins 170A. The relatively tall bin 170A is substantially similar to the relatively short bins 170B. However, the relatively tall bin 170A has a height HA greater than the height HB of the relatively short bin 170B. The stacked height SH of two relatively short bins 170B, when stacked together, is generally equal to the height HA of the relatively tall bin 170A. In addition, the height HB of the one relatively tall bin 170A and the stacked height SH of two relatively short bins 170B stacked together are each generally equal to the height or depth D of the base 114 of the storage device 18.

Figure 20:
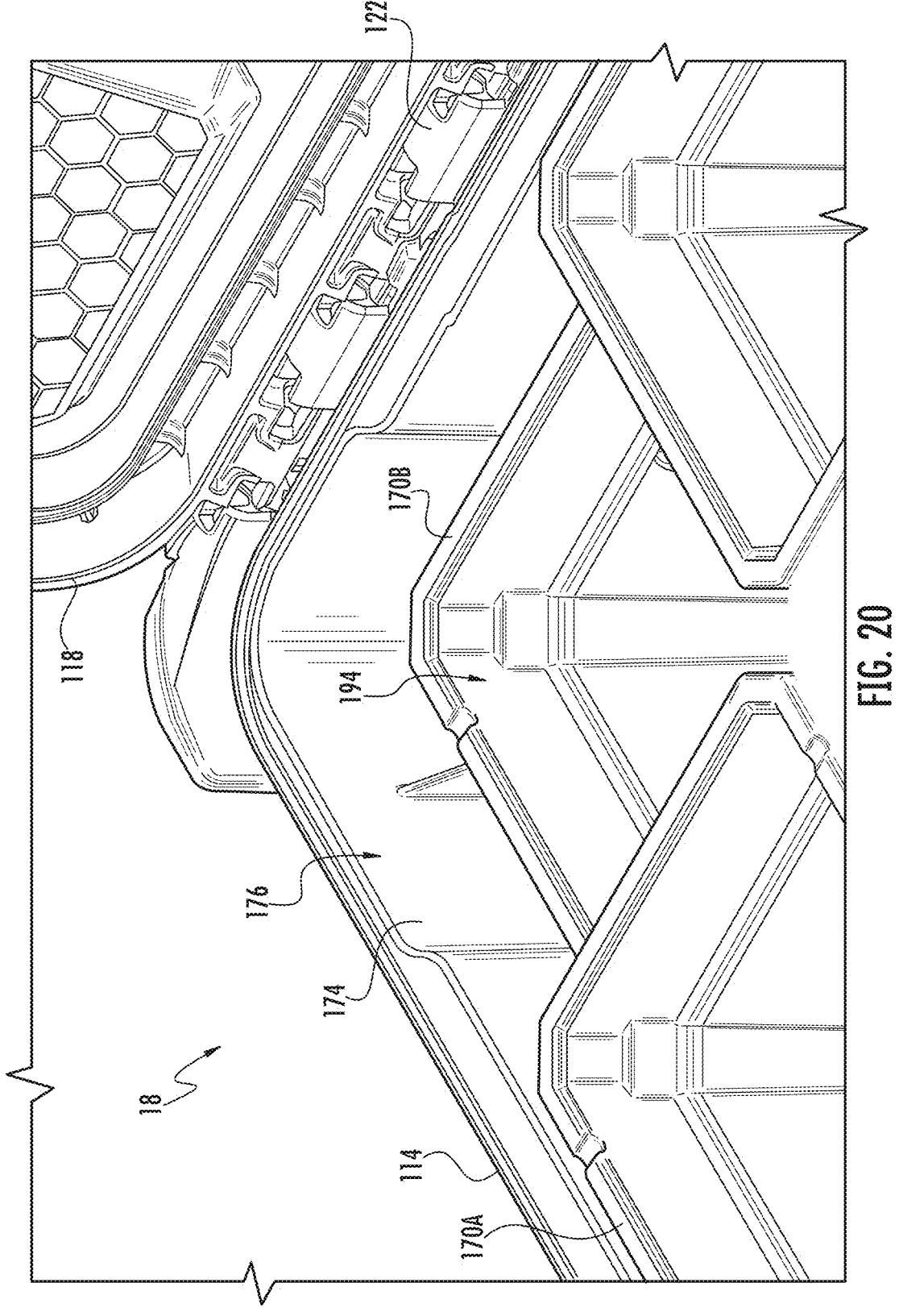
FIG. 20 is an enlarged view of a portion of the storage case in the open position.

As best shown in FIG. 20, a user may remove an upper bin of two stacked relatively short bins 170B within the base 114 of the storage case 18 to allow access to the storage space 194 of the lower bin 170B. Accordingly, the stacked bins 170B within the storage device 18 provide additional storage and organizing space that can be easily reconfigured and arranged as necessary.

Figure 21:
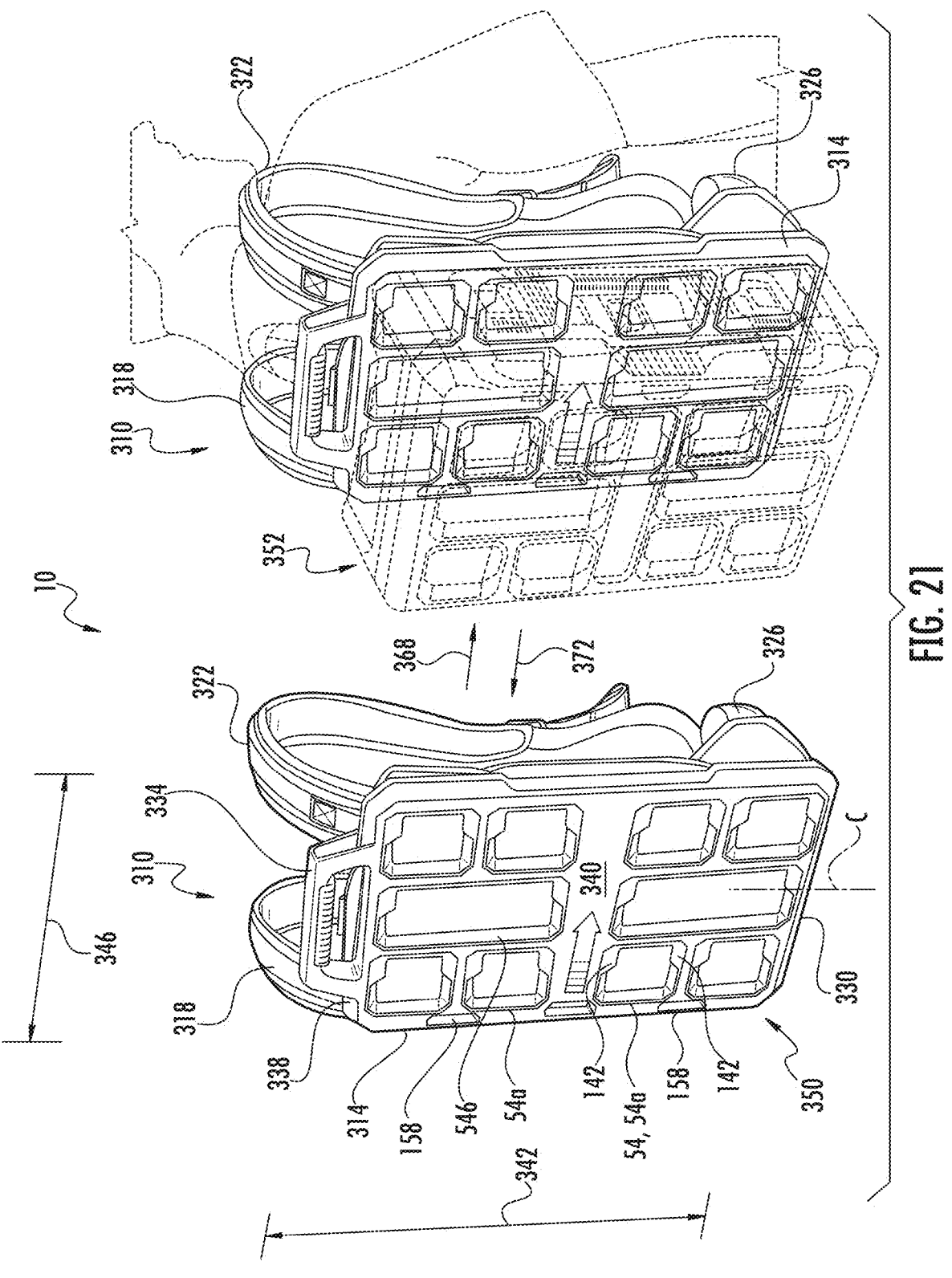
FIG. 21 is a perspective view of a backpack of the storage device system.

Referring to FIG. 21, in some embodiments, the storage device system 10 further includes a backpack 310 with a rigid base 314 and first and second flexible shoulder straps 318, 322 coupled to the base 314. The base 310 is configured to extend along a user's back when the shoulder straps 318, 322 extend over the user's shoulders. The length of each shoulder strap 318, 322 is preferably adjustable to allow the user to position the base 314 in a comfortable position along the user's back. In the illustrated embodiment, the backpack 310 also includes waist belt 326 coupled to the base 314 proximate a bottom end 330 of the base 314 and a handle 334 extending from a top end 338 of the base 314.

With continued reference to FIG. 21, a generally planar face 340 defines a rear surface of the base 314 that is oriented rearward when the backpack 310 is worn by the user. The base 314 defines a longitudinal axis C extending centrally through the top and bottom ends 338, 330. The illustrated base 314 is rectangular and includes a length 342 measured parallel to the longitudinal axis C and a width 346 measured perpendicular to the axis C. The length 342 is longer than the width 346 so as to generally correspond with the shape of the user's back.

Figure 25:
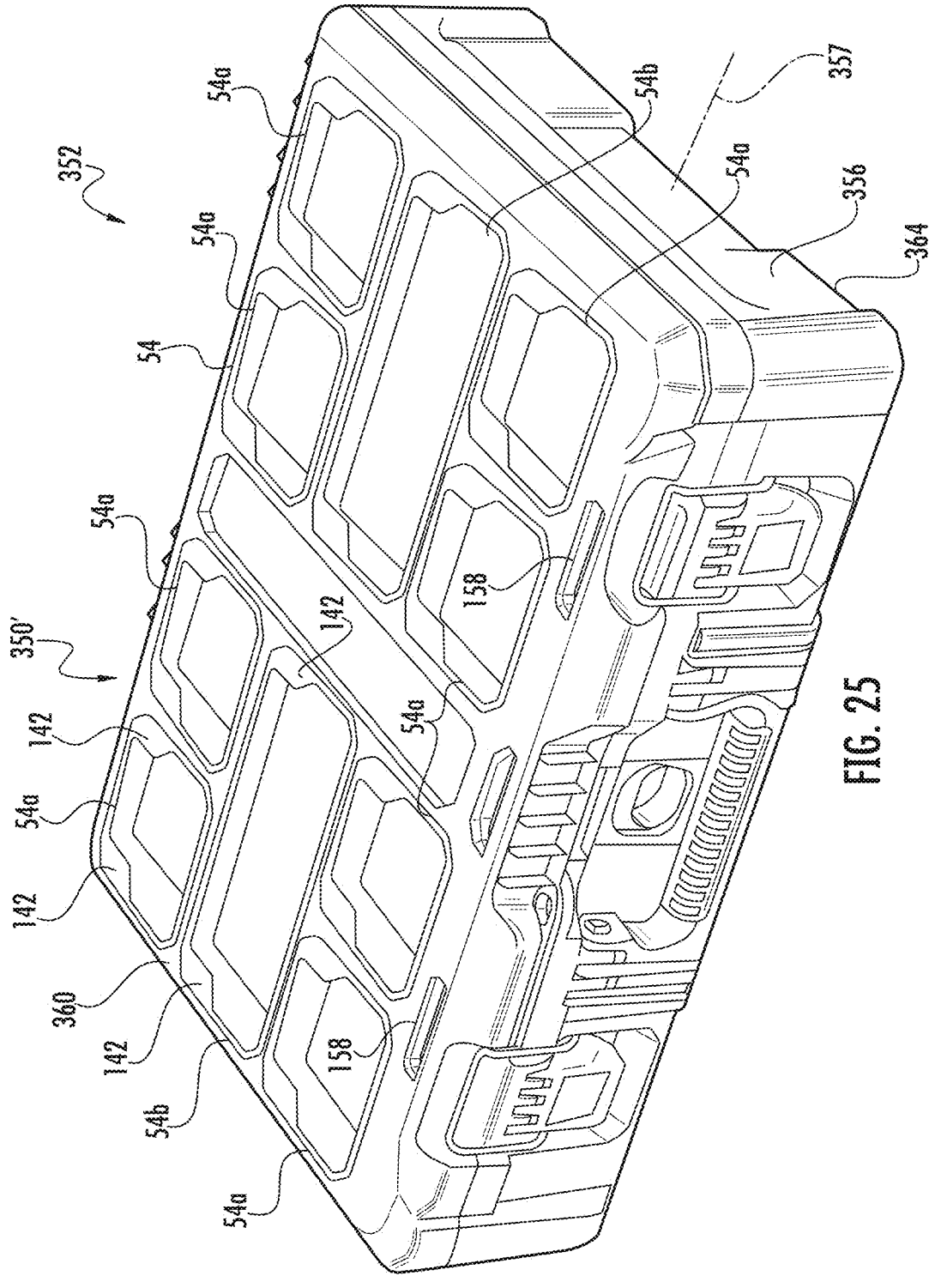
FIG. 25 is a perspective view of a tool storage container according to another embodiment.

The base 314 further includes an attachment interface 350 for receiving and removably coupling a tool storage container 352 to the base 314. Referring to FIG. 25, the illustrated tool storage container 352 includes a rigid body 356 defining a longitudinal axis 356 and a rigid lid 360 pivotally coupled to the body 356 (e.g., by a hinge). The illustrated attachment interface 350 also allows other tool storage containers of the storage device system 10 to be removably and interchangeably coupled to the base 314. For example, the bag 14 and the storage case 18 may be coupled to the base 314. The configuration of the base 314 advantageously allows the backpack 310 to be used to interchangeably carry a variety of different tool storage containers in a hands-free manner.

The attachment interface 350 on the base 314 includes a plurality of connection recesses 54—including small connection recesses 54a and large connection recesses 54b—like those on the cover 118 of the storage case 18 described above with reference to FIGS. 5 and 6. An interference projection or wing 142 extends into each connection recess 54 parallel to a longitudinal axis C of the base 314 on opposite sides of the connection recess 54 at one end of the connection recess 54. The attachment interface 350 further includes a plurality of locking apertures 158. In the illustrated embodiment, the attachment interface 350 includes two locking apertures 158 spaced in the length direction of the base 314.

The tool storage container 352 includes projections on a bottom surface 364 (FIG. 25) of the body 356, which are like the projections 46 described above with reference to FIGS. 3 and 4. The projections on the tool storage container 352 are receivable within the connection recesses 54 on the base 314, and each of the wings 142 corresponds to and is configured to cooperate with a channel 58 (FIG. 4) of the projection 46 received by the respective connection recess 54. The tool storage container 352 also includes a latch assembly like the latch assembly 78 described above with reference to FIGS. 7-10, with one or more interference portion(s) 94 that are receivable within the locking aperture (s) 158 on the base 314. In the illustrated embodiment, the lid 360 of the tool storage container 352 includes an attachment interface 350' that is substantially identical to the attachment interface 350 on the base 314 (FIG. 25). As such, one or more additional tool storage containers (not shown) can be coupled to the lid 360, such that the one or more additional tool storage containers can also be carried using the backpack 310.

In use, to couple the tool storage container 352 to the backpack 310, the user positions the bottom surface 364 the tool storage container 352 adjacent the rear surface 340 of the base 314 and aligns the projections 46 (FIG. 4) with the recesses 54 (FIG. 21) on the base 314. The user then slides the tool storage container 352 relative to the base 314 in a first direction 368, which is perpendicular to the longitudinal axis C and parallel with the width 346, to attach the tool storage container 352 to the base 314 generally in the manner described above for attaching the bag 14 to the case 18. Likewise, to decouple and remove the tool storage container 352 from the backpack 310, the user disengages the latch assembly 78 by moving the interference portion(s) 94 to the unlocking position in the manner described above. The user then slides the tool storage container 352 relative to the base 314 in a second direction 372 opposite the first direction 368. Once the projections 46 clear the recesses 54, the tool storage container 352 can be freely removed from the backpack 310.

Figure 22:
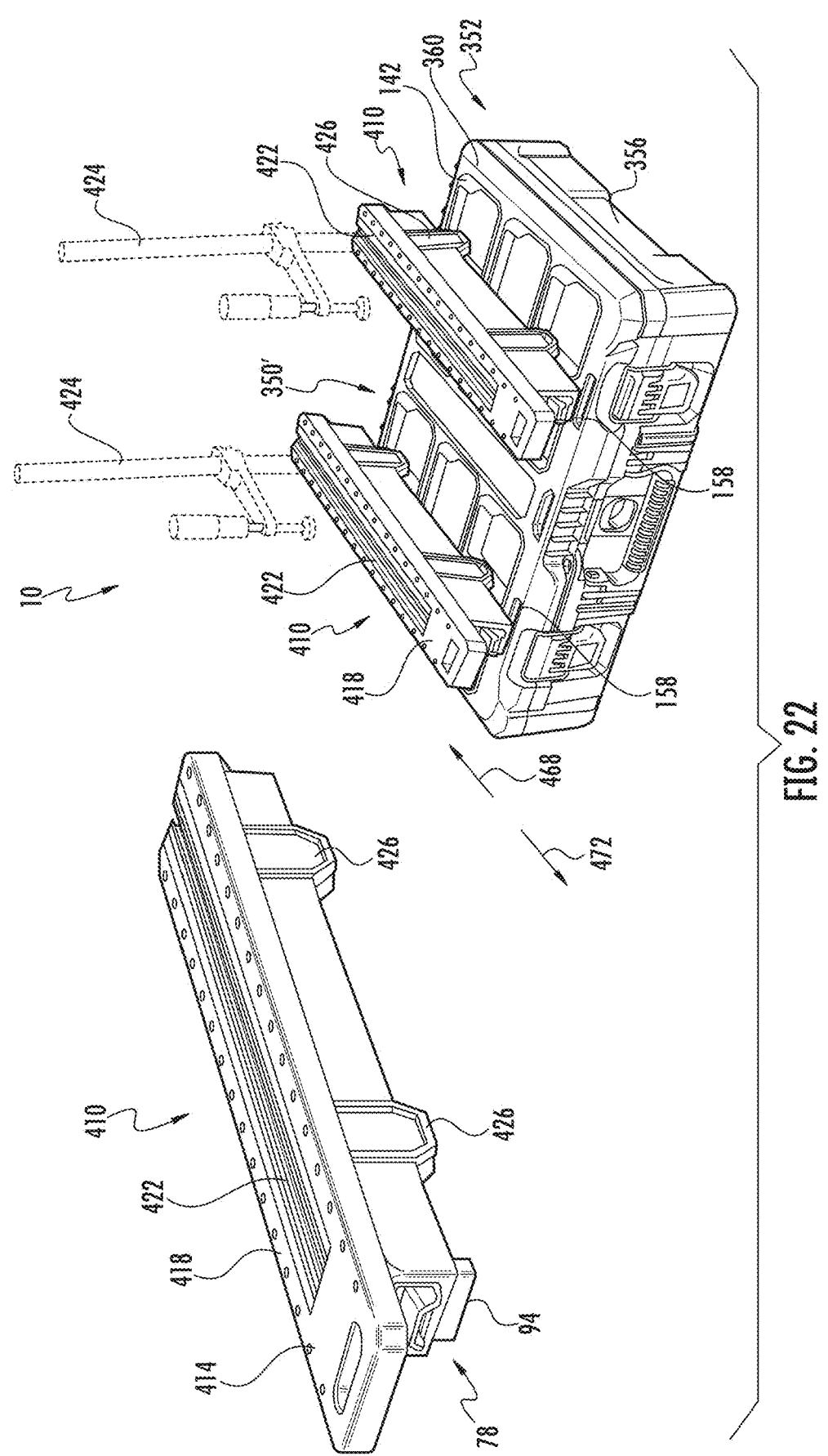
FIG. 22 illustrates an accessory rail usable with the storage device system.

Referring to FIG. 22, in some embodiments, the storage device system 10 further includes an accessory rail 410 configured for attachment to the attachment interface 350' on the lid 360 of the tool storage container 352 (or any other tool storage container of the system 10 that includes a similar attachment interface). The accessory rail 410 includes a latch assembly 78 with an interference portion 94 that is engageable with any of the locking apertures 158 on the tool storage container 352.

The accessory rail 410 includes a top side 414 defining a planar clamping surface 418 and a longitudinally-extending slot 422. A variety of different accessories can be coupled to the slot 422. For example, in the illustrated embodiment, a bar clamp 424 is coupled to the slot 422. The bar clamp 424 can thus be used to clamp a workpiece against the clamping surface 418 of the accessory rail 410. A pair of mounting brackets 426 extends downward from the bottom of the accessory rail 410. Each of the mounting brackets 426 is configured to receive one of the wings 142 on the attachment interface 350' when the accessory rail 410 is coupled to the lid 360.

In use, to couple the accessory rail 410 to the lid 360 of the tool storage container 352, the user aligns the mounting brackets 426 with the wings 142. The user then slides the accessory rail 410 relative to the base lid 360 in a first direction 468 and engages the interference portion 94 with one of the locking apertures 158. Likewise, to decouple and remove the accessory rail 410 from the lid 360, the user disengages the latch assembly 78 by moving the interference portion 94 to the unlocking position. The user then slides the accessory rail 410 relative to the lid 360 in a second direction 472 opposite the first direction 468. Once the mounting brackets 426 clear the wings 142, the rail 410 can be freely removed from the lid 410. The attachment interface 350' allows multiple accessory rails 410 to be attached to the lid 360 at the same time. The tool storage container 352 and accessory rails 410 can thus provide a portable workpiece support system.

Figure 23:
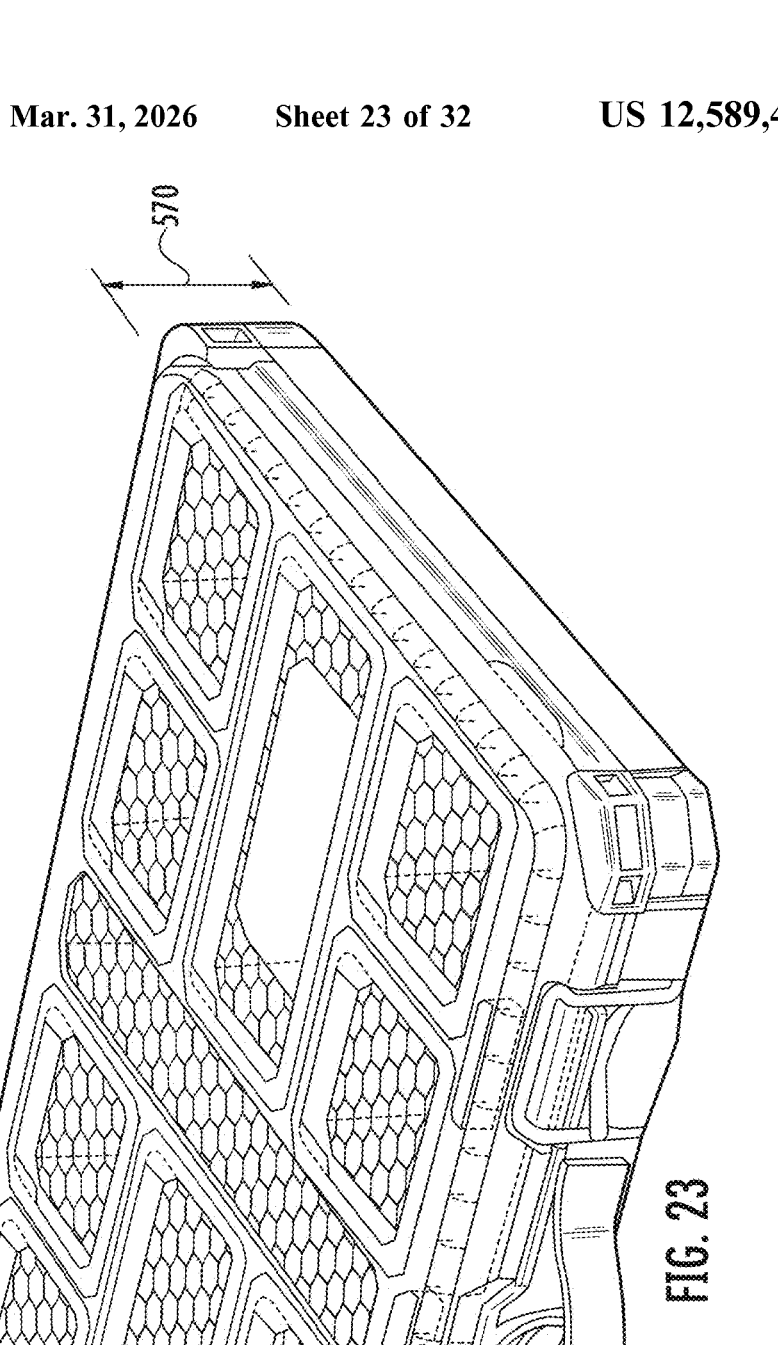
FIG. 23 is a perspective view of a tool storage container according to another embodiment.

FIG. 23 illustrates a tool storage container 552 according to another embodiment and that is usable with the storage device system 10. Like the tool storage container 352 described above, the tool storage container 552 includes a lid 560 provided with an attachment interface 550. The tool storage container 552 is thinner than the tool storage container 352. In some embodiments, for example, the tool storage container 552 is approximately half the thickness of the tool storage container 352. In some embodiments, the tool storage container 552 defines an overall thickness 570 between about 60 mm and about 70 mm.

Figure 24:
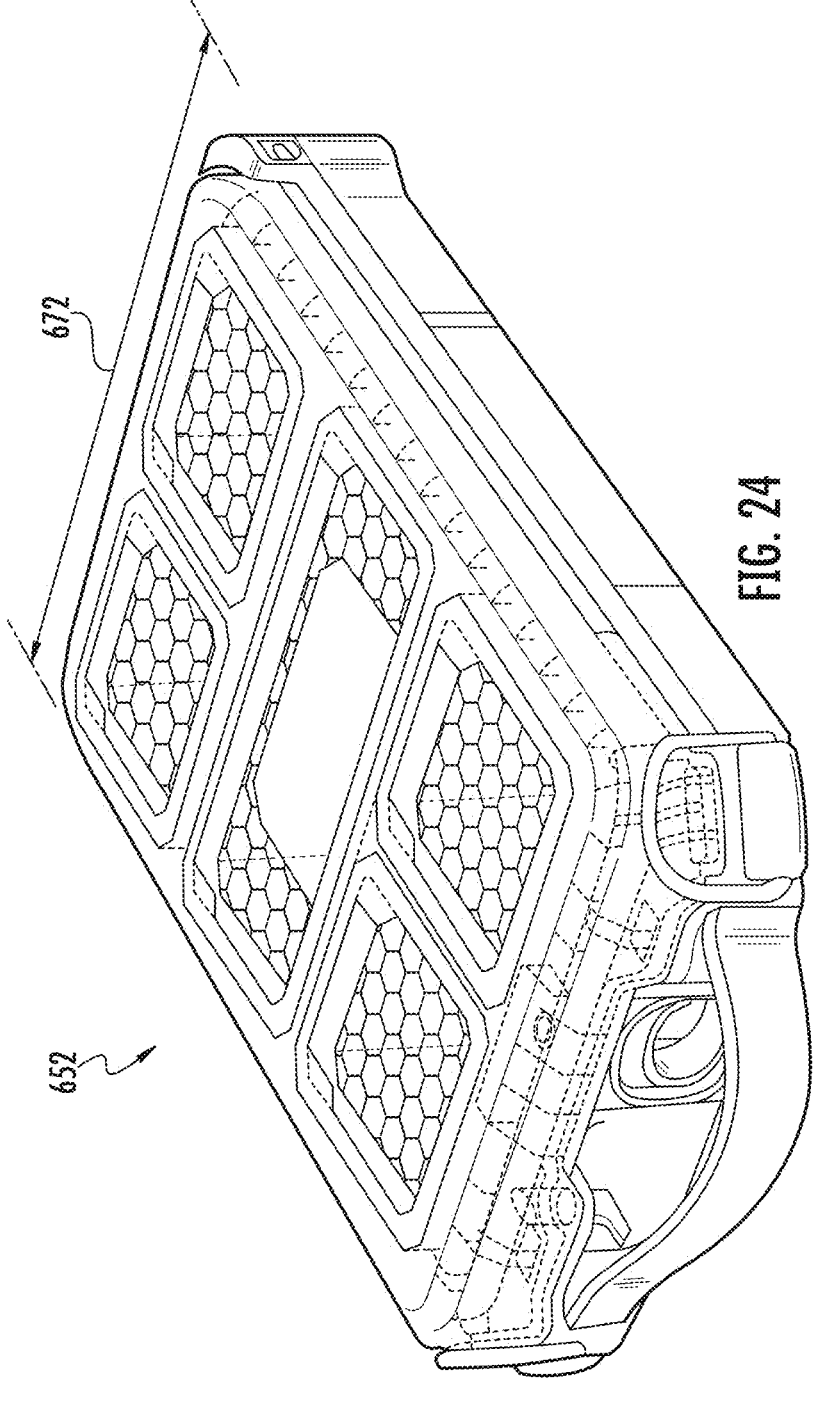
FIG. 24 is a perspective view of a tool storage container according to another embodiment.

FIG. 24 illustrates a tool storage container 652 according to another embodiment and that is usable with the storage device system 10. The tool storage container 652 is similar to the tool storage container 552 but is approximately half the width of the tool storage container 552. In some embodiments, the tool storage container 652 defines an overall width 672 between about 200 mm and about 300 mm.

Figure 26:
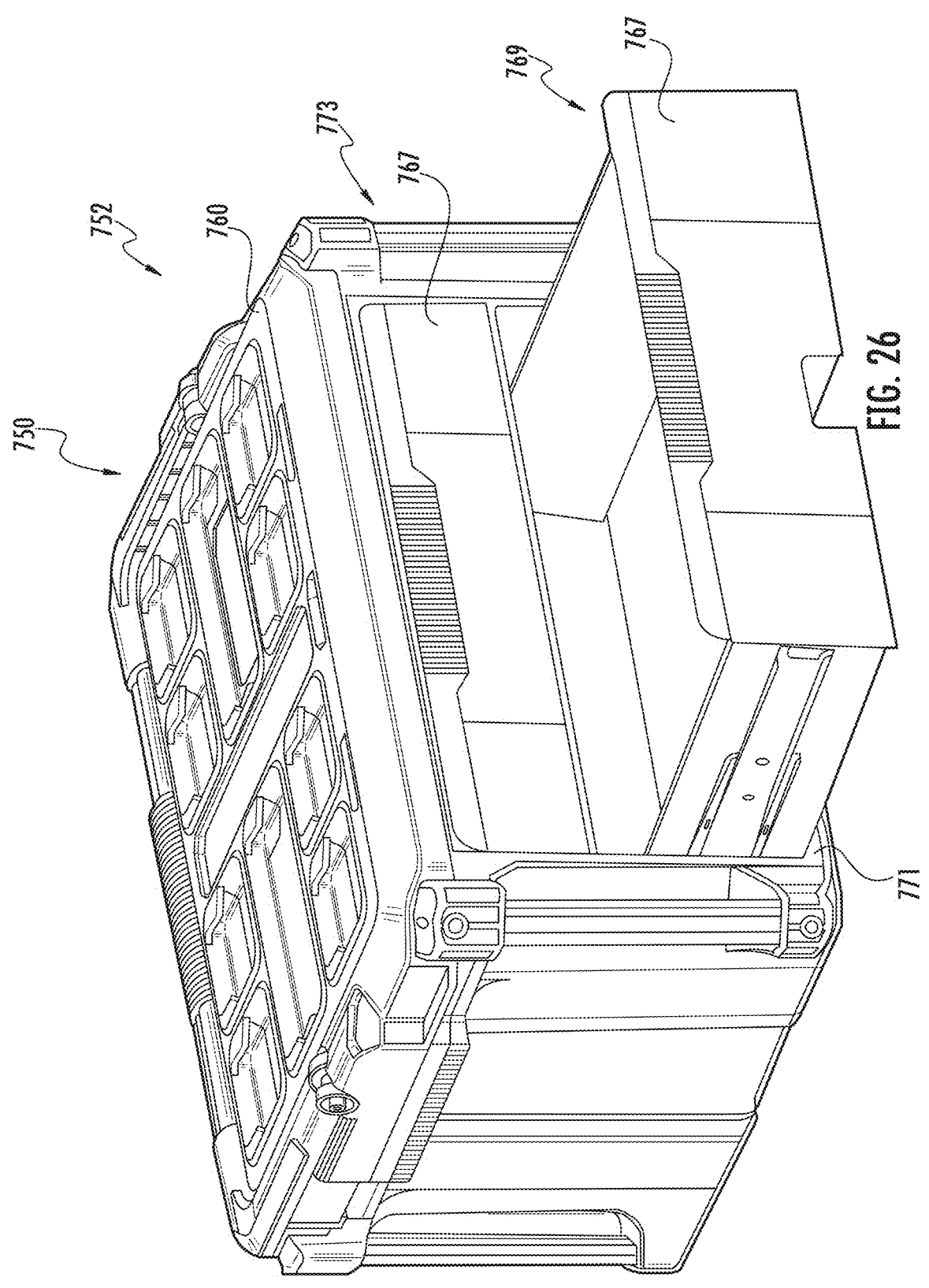
FIG. 26 is a perspective view of a tool storage container according to another embodiment.

FIG. 26 illustrates a tool storage container 752 according to another embodiment and that is usable with the storage device system 10. Like the tool storage container 352 described above, the tool storage container includes a lid 760 provided with an attachment interface 750. The tool storage container 752 further includes a plurality of drawers 767 that are slidable between an open position 769 projecting from a front side 771 of the storage container 752 and a closed position 773 in which the drawers 767 are generally flush with the front side 771 of the storage container 752. The drawers 767 provide convenient access to the contents of the tool storage container 752, even while other components of the storage device system 10 (e.g., an accessory rail 410, one or more other tool storage containers, etc.) are coupled to the attachment interface 750.

Figure 27:
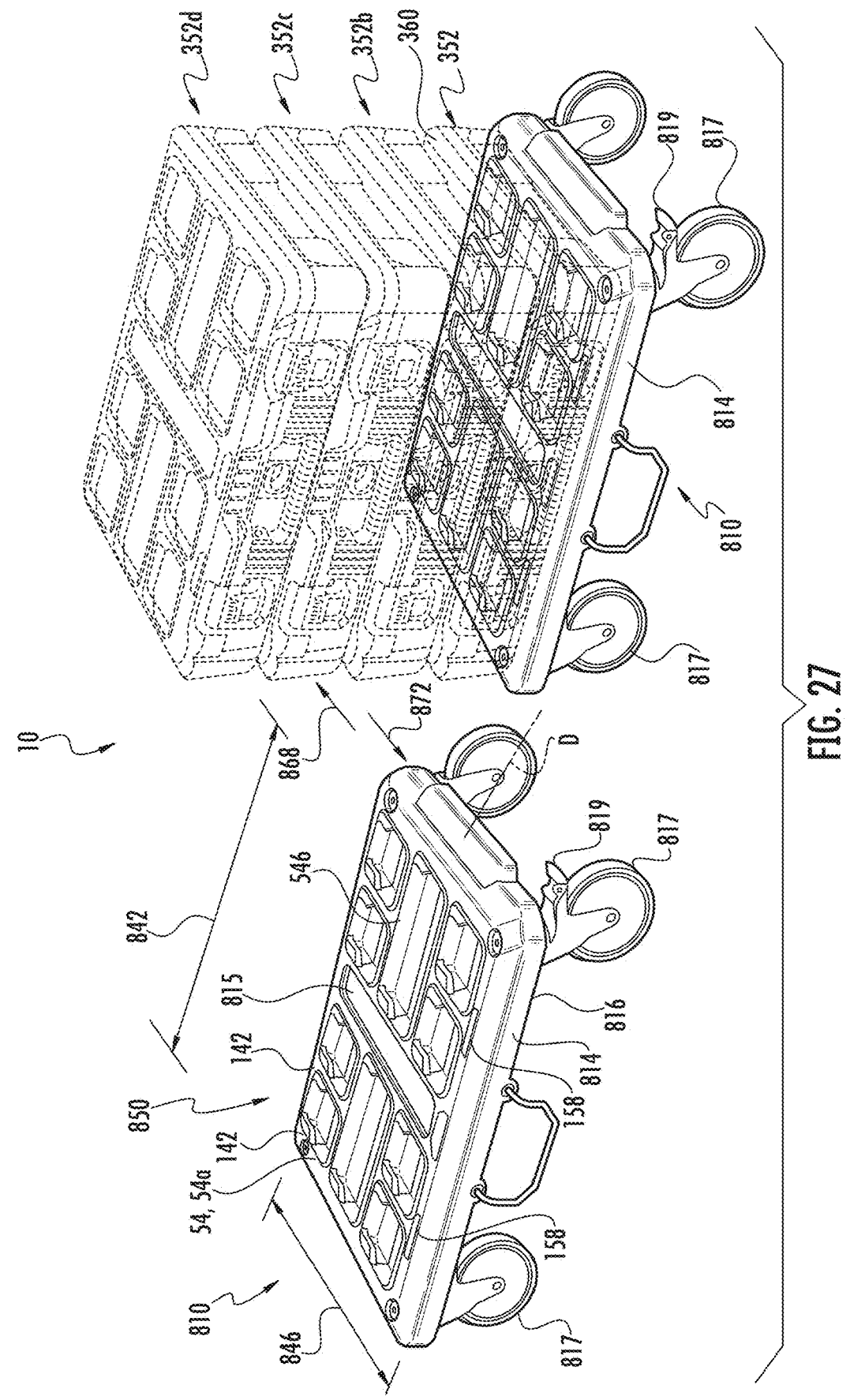
FIG. 27 is a perspective view of a tool cart of the storage device system.

Referring to FIG. 27, in some embodiments, the storage device system 10 further includes a tool cart 810 with a rigid base 814 having a top side 815 and a bottom side 816 opposite the top side 815. The base 814 is supported on a plurality of wheels 817 adjacent the bottom side 816. The illustrated wheels 817 are rotatable casters coupled to the base 814 proximate each of the four corners of the base 814. A brake 819 is coupled to one of the wheels 817 to secure the tool cart 810 in a desired position. In some embodiments, multiple brakes 819 may be provided for additional security. In addition, other types of wheels 817 may be used, and the wheels 817 may be arranged in any configuration suitable for supporting the base 814 in a stable manner.

The illustrated base 814 includes a length 842 and a width 846 measured perpendicular to the length 842. The base 814 defines a longitudinal axis D extending centrally through the base 814 in the length direction. The length 842 is longer than the width 846 such that the base 814 has a rectangular shape. The base 814 further includes an attachment interface 850 for receiving and removably coupling a tool storage container (e.g., the tool storage container 352) to the base 814. The illustrated attachment interface 850 also allows other tool storage containers of the storage device system 10 to be removably and interchangeably coupled to the base 814. The configuration of the base 814 advantageously allows the cart 810 to be used to interchangeably support and transport a variety of different tool storage containers.

The attachment interface 850 includes a plurality of connection recesses 54—including small connection recesses 54*a* and large connection recesses 54*b*—like those on the cover 118 of the storage case 18 described above with reference to FIGS. 5 and 6. An interference projection or wing 142 extends into each connection recess 54 parallel to the longitudinal axis D of the base 814 on opposite sides of the connection recess 54 at one end of the connection recess 54. The attachment interface 850 further includes a plurality of locking apertures 158. In the illustrated embodiment, the attachment interface 850 includes two locking apertures 158 spaced in the length direction of the base 814. As described above, the projections on the bottom surface 364 (FIG. 25) of the tool storage container 352 and latch assembly 78 cooperate with the attachment interface 850 to removably couple the tool storage container 352 to the base 814.

In use, to couple the tool storage container 352 to the tool cart 810, the user first engages the brake 819 to secure the cart 810. Next, the user positions the bottom surface 364 the tool storage container 352 adjacent the top side 815 of the base 814 and aligns the projections 46 (FIG. 4) with the recesses 54 (FIG. 27) on the base 814. The user then slides the tool storage container 352 relative to the base 814 in a first direction 868, which is perpendicular to the longitudinal axis D and generally parallel to the top side 815, to attach the tool storage container 352 to the base 814 generally in the manner described above for attaching the bag 14 to the case 18. The brake 819 inhibits the tool cart 810 from rolling under the force of the user attaching the container 352 to the base 814. Once the container 352 is attached, the user disengages the brake 819 and can then transport the tool storage container 352 by rolling the tool cart 810 along a surface (e.g., the ground).

Likewise, to decouple and remove the tool storage container 352 from the tool cart 810, the user engages the brake 819, then disengages the latch assembly 78 by moving the interference portion(s) 94 to the unlocking position in the manner described above. The user then slides the tool storage container 352 relative to the base 814 in a second direction 872 opposite the first direction 868. Once the projections 46 clear the recesses 54, the tool storage container 352 can be freely removed from the tool cart 810.

The cart 810 may be a particularly convenient means for transporting multiple storage containers at the same time. In the illustrated embodiment, a second tool storage container 352*b* can be coupled to the lid 360 of the tool storage container 352 in the same manner as described above. In particular, the second tool storage container 352*b* can be slid in the first direction 868 relative to the tool storage container 352 to attach the second tool storage container 352*b* to the lid 360 of the tool storage container 352, and the second tool storage container 352*b* can be slid in the second direction 872 relative to the tool storage container 352 to remove the second tool storage container 352*b*. Additional tool storage containers 352*c*, 352*d* can be further stacked in this manner and securely transported together on the tool cart 810.

FIG. 28 illustrates a cooler 910 according that is usable with the storage device system 10. The cooler includes a rigid body 914 and a rigid lid 918 coupled to the body 914. The body 914 and the lid 918 are insulated or are made of an insulating material. The lid 918 may be pivotally coupled to the body 914 in some embodiments or alternatively may be removably coupled to the body 914. The cooler 910 includes a plurality of projections (not shown) like the projections 46 described above that allow the cooler 910 to be removably coupled to other components of the storage device system 10. Likewise, the cooler 910 also includes a latch assembly 78.

Referring to FIG. 29, in some embodiments, the storage device system 10 further includes a tool cart 1010 with a rigid base 1014 having a top side 1015 and a bottom side 1016 opposite the top side 1015. The illustrated base 1014 includes a length 1042 and a width 1046 measured perpendicular to the length 1042. The length 1042 is longer than the width 1046 such that the base 1014 has a rectangular shape. A first end 1047 of the base 1014 extends between the top side 1015 and the bottom side 1016 in the width direction, and a second end 1048 of the base 1014 extends between the top side 1015 and the bottom side 1016 opposite the first end 1047. The base 1014 defines a longitudinal axis E extending centrally through the base 1014 in the length direction, through the first and second ends 1047, 1048.

In the illustrated embodiment, the base 1014 is supported on first and second wheels 1017*a*, 1017*b* adjacent the second end 1048. The cart 1010 includes a handle 1049 extending from the first end 1047. The illustrated handle 1049 is generally U-shaped and includes a grip portion 1049*a* spanning between two leg portions 1049*b*. The handle 1049 may be slidable relative to the base 1014 in order to extend or retract the handle 1049.

The base 1014 further includes an attachment interface 1050 for receiving and removably coupling a tool storage container (e.g., the tool storage container 352) or multiple tool storage containers to the base 1014 generally in the same manner as described above with respect to the tool cart 810 illustrated in FIG. 27.

Referring to FIG. 30, in some embodiments, the storage device system 10 further includes an adjustable shelf unit 1110. The adjustable shelf unit 1110 includes a frame 1114 and a plurality of shelves 1118 movably coupled to the frame 1114. The shelves 1118 can thus be positioned on the frame 1114 at a variety of different spacings. In the illustrated embodiment, the frame 1114 includes a bottom portion 1122 with a plurality of wheels 1126 (e.g., casters) that support the frame 1114. As such, the frame 1114 is mobile and can be conveniently moved about a job site. In other embodiments, the frame 1114 may be secured to a wall, the interior of a vehicle, or other fixed structures, for example.

Referring to FIG. 31, each of the shelves 1118 includes an attachment interface 1150 that is compatible with any of the storage containers of the storage device system 10. Thus, as illustrated in FIG. 30, the tool storage container 352 or any other tool storage container of the system 10 can be removably coupled to any of the shelves 1118. In addition, the shelves 1118 can be spaced such that the lid 360 of the container 352 is openable even while the body 356 of the container 352 remains coupled to the shelf 1118.

Referring to FIG. 32, in some embodiments, the storage device system 10 further includes two clamp rails 1210 configured for attachment to the attachment interface 350' on the lid 360 of the tool storage container 352 (or any other tool storage container of the system 10 that includes a similar attachment interface). Each clamp rail 1210 includes a latch assembly 78 with an interference portion 94 that is engageable with any of the locking apertures 158 (FIG. 25) on the tool storage container 352.

Each clamp rail 1210 includes first and second pairs of clamping jaws 1222 located at opposite ends of the clamp rail 410. Each set of clamping jaws 1222 may be adjustable to vary a distance between the individual jaws 1222, or the individual jaws 1222 may be spaced at a fixed spacing. In some embodiments, the individual jaws 1222 may be resiliently deformable to apply a resilient clamping force on a workpiece 1225 (e.g., a 2x4). The clamping jaws 1222 are configured to support the workpiece 1225 above the lid 360 of the container 352. The tool storage container 352 and clamping rails 1210 can thus provide a portable workpiece support system.

Various features of the invention are set forth in the following claims.

What is claimed is:

1. A tool cart comprising:
a plurality of wheels configured to support the tool cart on a surface such that the tool cart can roll along the surface;
a base including a top side and a bottom side opposite the top side, the plurality of wheels adjacent the bottom side;
a plurality of connection recesses defined by the base, each of the plurality of connection recesses including a rear wall, a front wall opposite the rear wall, a first side wall extending between the rear wall and the front wall, a second side wall opposite the first side wall and extending between the rear wall and the front wall, a first wing extending from the rear wall towards the front wall and from the first side wall towards the second side wall, and a second wing extending from the rear wall towards the front wall and from the second side wall towards the first side wall, each of the plurality of connection recesses configured to be removably coupled to a tool storage container, wherein the tool storage container slides in a first direction relative to the base and generally parallel to the top side to attach the tool storage container to the base, and wherein the tool storage container slides in a second direction, opposite the first direction, relative to the base and generally parallel to the top side to remove the tool storage container from the base; and
a first brake configured to inhibit the tool cart from rolling when the tool storage container is being coupled to the base.

2. The tool cart of claim 1, wherein the base is rectangular and the base includes a length and a width, the length being longer than the width, and wherein the first and second directions are parallel to the width.

3. The tool cart of claim 1, wherein the plurality of connection recesses are configured to be removably coupled to a plurality of projections extending from a bottom surface of the tool storage container, each of the plurality of projections including two channels on each side of the respective projection, and wherein the plurality of projections are received in the plurality of connection recesses as the tool storage container slides in the first direction relative to the base to attach the tool storage container to the base.

4. The tool cart of claim 3, further comprising a first locking aperture configured to engage with a latch assembly of the tool storage container to removably couple the tool storage container to the base.

5. The tool cart of claim 4, wherein engagement between the first locking aperture and the latch assembly of the tool storage container prevents disengagement between the plurality of connection recesses and the plurality of projections.

6. The tool cart of claim 4, wherein engagement between the first locking aperture and the latch assembly of the tool storage container prevents sliding disengagement between the plurality of connection recesses and the plurality of projections.

7. The tool cart of claim 4, wherein the base extends from a rear to a front, wherein for each of the plurality of connection recesses the front wall is closer to the front of the base than the rear wall, wherein the first locking aperture is closer to the front of the base than each of the plurality of connection recesses.

8. The tool cart of claim 7, further comprising a plurality of locking apertures, including the first locking aperture, the plurality of locking apertures configured to engage with the latch assembly of the tool storage container to removably couple the tool storage container to the base.

9. The tool cart of claim 8, wherein the plurality of locking apertures are closer to the front of the base than each of the plurality of connection recesses.

10. The tool cart of claim 1, wherein the first brake is coupled to one of the plurality of wheels.

11. The tool cart of claim 1, further comprising a plurality of brakes, including the first brake, the plurality of brakes configured to inhibit the tool cart from rolling when the tool storage container is being coupled to the base.

12. The tool cart of claim 11, wherein each of the plurality of brakes are coupled to one of the plurality of wheels.

13. The tool cart of claim 1, wherein the plurality of wheels consist of four wheels.

14. The tool cart of claim 1, the plurality of connection recesses comprising at least four rows of connection recesses, each of the at least four rows arranged along an axis parallel to the first direction.

15. The tool cart of claim 14, wherein each of the four rows comprises at least two connection recesses of the plurality of connection recesses.

16. The tool cart of claim 15, the plurality of connection recesses comprising at least three columns of connection recesses, each of the at least three columns arranged along an axis perpendicular to the first direction.

17. The tool cart of claim 16, wherein each of the three columns comprises at least two connection recesses of the plurality of connection recesses.

* * * * *